(12) United States Patent
Tanaka et al.

(10) Patent No.: US 8,982,226 B2
(45) Date of Patent: Mar. 17, 2015

(54) CAMERA CAPABLE OF TAKING MOVIE

(75) Inventors: Masahide Tanaka, Toyonaka (JP); Akihiko Obama, Tokyo (JP); Satoshi Kazahaya, Yokohama (JP); Hiroki Harada, Zushi (JP); Hiroki Ono, Kawasaki (JP); Kentaro Terao, Yokohama (JP)

(73) Assignee: Nikon Corporation, Tokyo (JP)

( * ) Notice: Subject to any disclaimer, the term of this patent is extended or adjusted under 35 U.S.C. 154(b) by 680 days.

(21) Appl. No.: 12/308,459

(22) PCT Filed: Jun. 28, 2007

(86) PCT No.: PCT/JP2007/063007
§ 371 (c)(1),
(2), (4) Date: Dec. 16, 2008

(87) PCT Pub. No.: WO2008/001850
PCT Pub. Date: Jan. 3, 2008

(65) Prior Publication Data
US 2009/0309989 A1  Dec. 17, 2009

(30) Foreign Application Priority Data

Jun. 30, 2006  (JP) .................................. 2006-181529

(51) Int. Cl.
H04N 5/225 (2006.01)
H04N 5/76 (2006.01)
H04N 5/222 (2006.01)
H04N 5/232 (2006.01)
H04N 1/21 (2006.01)
H04N 5/77 (2006.01)
H04N 9/82 (2006.01)
H04N 5/775 (2006.01)
H04N 9/79 (2006.01)

(52) U.S. Cl.
CPC ............. *H04N 5/232* (2013.01); *H04N 1/2112* (2013.01); *H04N 1/212* (2013.01); *H04N 5/23293* (2013.01); *H04N 5/772* (2013.01); *H04N 9/8205* (2013.01); *H04N 5/775* (2013.01); *H04N 9/7921* (2013.01); *H04N 9/8227* (2013.01); *H04N 2201/214* (2013.01); *H04N 2201/3215* (2013.01); *H04N 2201/3288* (2013.01); *H04N 2201/3298* (2013.01)
USPC ................ 348/220.1; 348/231.5; 348/333.05; 348/333.06

(58) Field of Classification Search
None
See application file for complete search history.

(56) References Cited

U.S. PATENT DOCUMENTS 6,359,649 B1  3/2002  Suzuki
6,606,451 B2  8/2003  Honda et al.
(Continued)

FOREIGN PATENT DOCUMENTS

JP  A-2-312364  12/1990
JP  A-8-275034  10/1996
(Continued)

*Primary Examiner* — Lin Ye
*Assistant Examiner* — John H Morehead, III
(74) *Attorney, Agent, or Firm* — Oliff PLC

(57) ABSTRACT

An imaging apparatus includes: an imaging unit that repeatedly captures images of a subject to obtain image information; a recording unit that records timing information indicative of a given point in time during an imaging period of the image information; and a display unit that displays an image corresponding to the timing information, which is extracted from the image information, in response to an end of the imaging period.

21 Claims, 14 Drawing Sheets

(56) References Cited

U.S. PATENT DOCUMENTS

| | | | |
|---|---|---|---|
| 6,781,629 B2* | 8/2004 | Ohnogi | 348/333.01 |
| 6,791,617 B1* | 9/2004 | Nakamura | 348/345 |
| 6,919,927 B1* | 7/2005 | Hyodo | 348/333.02 |
| 7,623,176 B2* | 11/2009 | Hoshino et al. | 348/333.02 |
| 7,710,489 B2 | 5/2010 | Misawa et al. | 348/333.05 |
| 2002/0036702 A1* | 3/2002 | Ohnogi | 348/333.05 |
| 2002/0093571 A1* | 7/2002 | Hyodo | 348/220 |
| 2004/0145660 A1* | 7/2004 | Kusaka | 348/211.2 |
| 2004/0189823 A1 | 9/2004 | Shibutani | |
| 2004/0202456 A1* | 10/2004 | Sasagawa | 386/120 |
| 2005/0052553 A1* | 3/2005 | Kido et al. | 348/296 |
| 2005/0151858 A1* | 7/2005 | Nozaki et al. | 348/231.9 |
| 2005/0264678 A1* | 12/2005 | Butterworth | 348/345 |
| 2006/0050997 A1* | 3/2006 | Imamura | 382/312 |
| 2006/0109357 A1* | 5/2006 | Oda | 348/272 |
| 2006/0256203 A1* | 11/2006 | Honma | 348/220.1 |
| 2007/0123302 A1* | 5/2007 | Kim et al. | 455/557 |
| 2008/0192129 A1* | 8/2008 | Walker et al. | 348/231.2 |
| 2010/0134656 A1* | 6/2010 | Ogawa et al. | 348/231.2 |
| 2011/0069214 A1* | 3/2011 | Nakano | 348/333.01 |

FOREIGN PATENT DOCUMENTS

| | | |
|---|---|---|
| JP | A-10-224727 | 8/1998 |
| JP | A-2004-297177 | 10/2004 |
| JP | A-2004-304425 | 10/2004 |

* cited by examiner

FIG.3

| MODE | | IMAGE RECORDING METHOD |
|---|---|---|
| PICTURE -TAKING | SIMPLE STILL-PICTURE | STILL-IMAGE COMPRESSION |
| | SHORT MOVIE | MOVIE COMPRESSION |
| | SIMPLE MOVIE | MOVIE COMPRESSION |
| | MOVIE /MANUAL STILL-PICTURE | MOVIE COMPRESSION |
| | MOVIE /AUTOMATIC STILL-PICTURE | MOVIE COMPRESSION |
| REPRODUCTION | STILL IMAGE | MOVIE COMPRESSION /STILL-IMAGE COMPRESSION |
| | VOICE-ACCOMPANIED STILL IMAGE | MOVIE COMPRESSION /STILL-IMAGE COMPRESSION |
| | SHORT MOVIE | MOVIE COMPRESSION |
| | HIGHLIGHT MOVIE | MOVIE COMPRESSION |
| | SIMPLE MOVIE | MOVIE COMPRESSION |

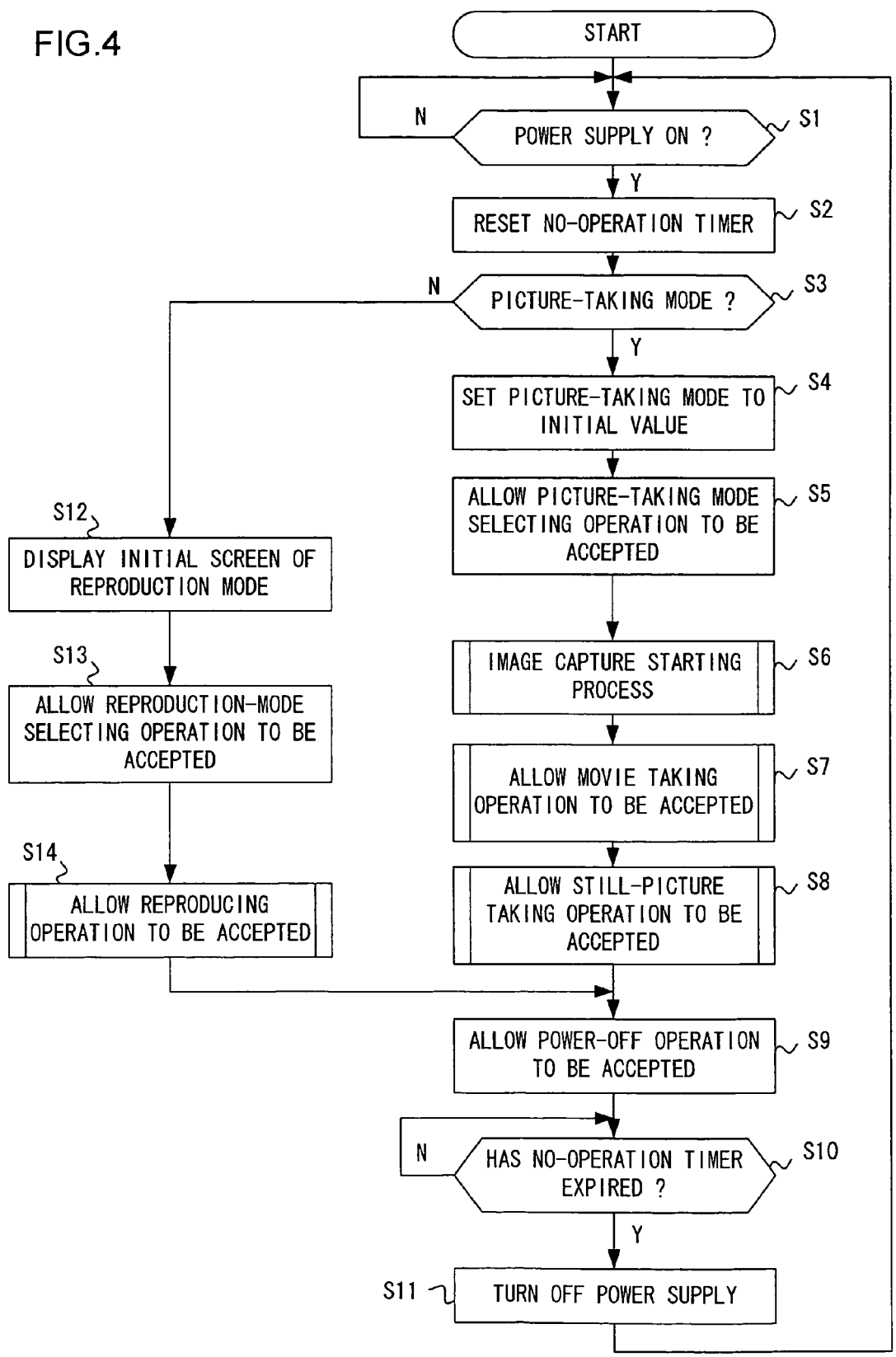

CAMERA CAPABLE OF TAKING MOVIE

TECHNICAL FIELD

The invention relates to a camera capable of taking a movie.

BACKGROUND ART

Digital cameras capable of taking a movie as well as a still picture are widely known. Among these cameras, cameras arranged to take a still picture and a movie independently of each other, and cameras capable of taking a still picture during taking of a movie have been proposed (see, for example, Patent Document 1 below).

In the known cameras, when a switch provided for taking a still picture is operated during taking of a movie, an identifying signal indicative of the time of the switching operation is recorded along with movie information. When the still-picture image is to be reproduced, an image captured when the switch is operated is read from the movie information, based on the identifying signal, and is reproduced.

Patent Document 1: Japanese Laid-Open Patent Publication No. H02-312364

DISCLOSURE OF THE INVENTION

Problems to be Solved by the Invention

In the known camera, however, a special operation or manipulation was required for checking pictures taken by the camera.

Means for Solving the Problems

According to the 1st aspect of the present invention, an imaging apparatus comprises: an imaging unit that repeatedly captures images of a subject to obtain image information; a recording unit that records timing information indicative of a given point in time during an imaging period of the image information; and a display unit that displays an image corresponding to the timing information, which is extracted from the image information, in response to an end of the imaging period.

According to the 2nd aspect of the present invention, in the imaging apparatus according to the 1st aspect, it is preferred that: the imaging apparatus further comprises a movie taking directing unit that directs starting and finishing of picture-taking for movie information based on the image information; and a timing information generating unit that generates the timing information; and the recording unit records the movie information and the timing information, in response to the movie taking directing unit and the timing information generating unit.

According to the 3rd aspect of the present invention, in the imaging apparatus according to the 2nd aspect, it is preferred that the imaging apparatus further comprises a display control unit that displays an image provided by at least a part of the movie information recorded by the recording unit, on the display unit, based on the timing information, in response to finishing of movie taking.

According to the 4th aspect of the present invention, in the imaging apparatus according to any one of the 1st through 3rd aspects, it is preferred that the imaging apparatus further comprises an information generating operation unit that is manually operated to cause the timing information generating unit to generate the timing information.

According to the 5th aspect of the present invention, in the imaging apparatus according to the 4th aspect, it is preferred that a still-picture taking operation unit that designates a recording time of a still image based on the image information is provided as the timing information generating unit.

According to the 6th aspect of the present invention, in the imaging apparatus according to the 5th aspect, it is preferred that the recording unit records still image information, in response to an operation of the still-picture taking operation unit.

According to the 7th aspect of the present invention, in the imaging apparatus according to the 6th aspect, it is preferred that the recording unit records the still image information independently of the movie information, based on the operation of the still-picture taking operation unit.

According to the 8th aspect of the present invention, in the imaging apparatus according to any one of the 1st through 7th aspects, it is preferred that the timing information is generated based on a picture-taking condition.

According to the 9th aspect of the present invention, in the imaging apparatus according to the 8th aspect, it is preferred that the timing information is generated based on a lapse of a picture-taking period of time.

According to the 10th aspect of the present invention, in the imaging apparatus according to the 6th or 7th aspect, it is preferred that: the imaging apparatus further comprises a detecting unit that detects a change in conditions during picture-taking; and the timing information is generated based on a result of detection of the detecting unit.

According to the 11th aspect of the present invention, in the imaging apparatus according to any one of the 3rd through 10th aspects, it is preferred that the display control unit causes the display unit to display the movie information spanning a given period of time including a time corresponding to the timing information, as a movie.

According to the 12th aspect of the present invention, in the imaging apparatus according to the 11th aspect, it is preferred that the display control unit changes a reproduction rate of the movie information spanning the given period of time to cause the display unit to display the movie information as a movie.

According to the 13th aspect of the present invention, in the imaging apparatus according to the 11th or 12th aspect, it is preferred that the display control unit extracts a plurality of pieces of movie information each spanning the given period of time including a time corresponding to each of a plurality of pieces of the timing information, based on the timing information recorded, and connects the extracted pieces of movie information together for display on the display unit.

According to the 14th aspect of the present invention, in the imaging apparatus according to the 11th or 12th aspect, it is preferred that the display control units extracts a plurality of pieces of movie information each spanning the given period of time including a time corresponding to each of a plurality of pieces of the timing information, based on the timing information recorded, and causes the display unit to display images provided by the extracted pieces of movie information at the same time.

According to the 15th aspect of the present invention, in the imaging apparatus according to any one of the 1st through 14th aspects, it is preferred that the display control unit causes the display unit to display a still image over a given period of time, based on the movie information captured at a time corresponding to the timing information.

According to the 16th aspect of the present invention, in the imaging apparatus according to the 15th aspect, it is preferred that the display control unit causes the display unit to successively display still images captured at times corresponding to a plurality of pieces of the timing information, at predetermined time intervals, based on the plurality of pieces of the timing information recorded.

According to the 17th aspect of the present invention, in the imaging apparatus according to the 15th or 16th aspect, it is preferred that the display control unit causes the display unit to display still images captured at times corresponding to a plurality of pieces of the timing information, at the same time, based on the plurality of pieces of the timing information recorded.

According to the 18th aspect of the present invention, in the imaging apparatus according to any one of the 1st through 16th aspects, it is preferred that: the imaging apparatus further comprises a manual operation unit that can be operated during display of the image by the display control unit; and the display control unit causes the display unit to display movie information spanning a given period of time including a time corresponding to the timing information as a movie, and causes the display unit to display a still image having a larger amount of information than a corresponding image of the movie, in place of the movie that are being displayed on the display unit, when the manual operation unit is operated.

According to the 19th aspect of the present invention, in the imaging apparatus according to any one of the 1st through 17th aspects, it is preferred that the imaging apparatus further comprises an operation switching unit that causes the display control unit to operate in a selected one of a plurality of modes.

According to the 20th aspect of the present invention, an imaging apparatus comprises: an imaging unit that captures an image of a subject; a movie taking directing unit that directs starting and finishing of picture-taking for movie information based on image information from the imaging unit; a recording control unit that records the movie information in response to the movie taking directing unit; a display unit; a reproduction control unit that causes the display unit to display images provided by the movie information recorded by the recording control unit; and a manual operation unit that can be operated during display by the reproduction control unit, and the reproduction control unit causes the display unit to display a still image having a larger information than a corresponding image of the movie that are being displayed, in place of the movie, when the manual operation unit is operated.

According to the 21st aspect of the present invention, an image displaying method comprising: repeatedly capturing images of a subject and recording image information; recording timing information indicative of a given point in time during an imaging period of the image information; and displaying an image corresponding to the timing information, which is extracted from the image information, in response to an end of the imaging period.

According to the 22nd aspect of the present invention, in the image displaying method according to the 21st aspect, it is preferred that the recorded image information comprises movie information.

According to the 23rd aspect of the present invention, in the image displaying method according to the 21st or 22nd aspect, it is preferred that the timing information is recorded according to a picture-taking condition of the image information.

According to the 24th aspect of the present invention, in the image displaying method according to the 23rd aspect, it is preferred that the timing information is recorded based on a lapse of a picture-taking time of the image information.

According to the 25th aspect of the present invention, in the image displaying method according to the 23rd aspect, it is preferred that the timing information is recorded in response to a change in conditions during picture-taking for the image information.

According to the 26th aspect of the present invention, in the image displaying method according to any one of the 21st through 25th aspects, it is preferred that the image information spanning a given period of time including a time corresponding to the timing information is displayed in a form of movie, as the image corresponding to the timing information.

According to the 27th aspect of the present invention, in the image displaying method according to the 26th aspect, it is preferred that the image information spanning the given period of time is displayed in the form of movie, as the image corresponding to the timing information, at a reproduction rate that is changed.

According to the 28th aspect of the present invention, in the image displaying method according to the 26th or 27th aspect, it is preferred that a plurality of pieces of the image information each spanning the given period of time including a time corresponding each of a plurality of pieces of the timing information are connected together, and are displayed as the image corresponding to the timing information.

According to the 29th aspect of the present invention, in the image displaying method according to the 21st or 22nd aspect, it is preferred that a still image is displayed as the image corresponding to the timing information.

Advantageous Effect of the Invention

According to the present invention, a part of the movie information recorded in the recording unit is displayed on the display unit based on the timing signal(s), in response to, for example, the end of movie shooting, thus making it possible to easily check the pictures taken by the camera.

BRIEF DESCRIPTION OF THE DRAWINGS

FIG. 3 is an explanatory view showing details of picture-taking modes and reproduction modes;

FIG. 4 is a flowchart illustrating the operation of a controller in the embodiment shown in FIG. 1;

BEST MODE FOR CARRYING OUT THE INVENTION

Figure 1:
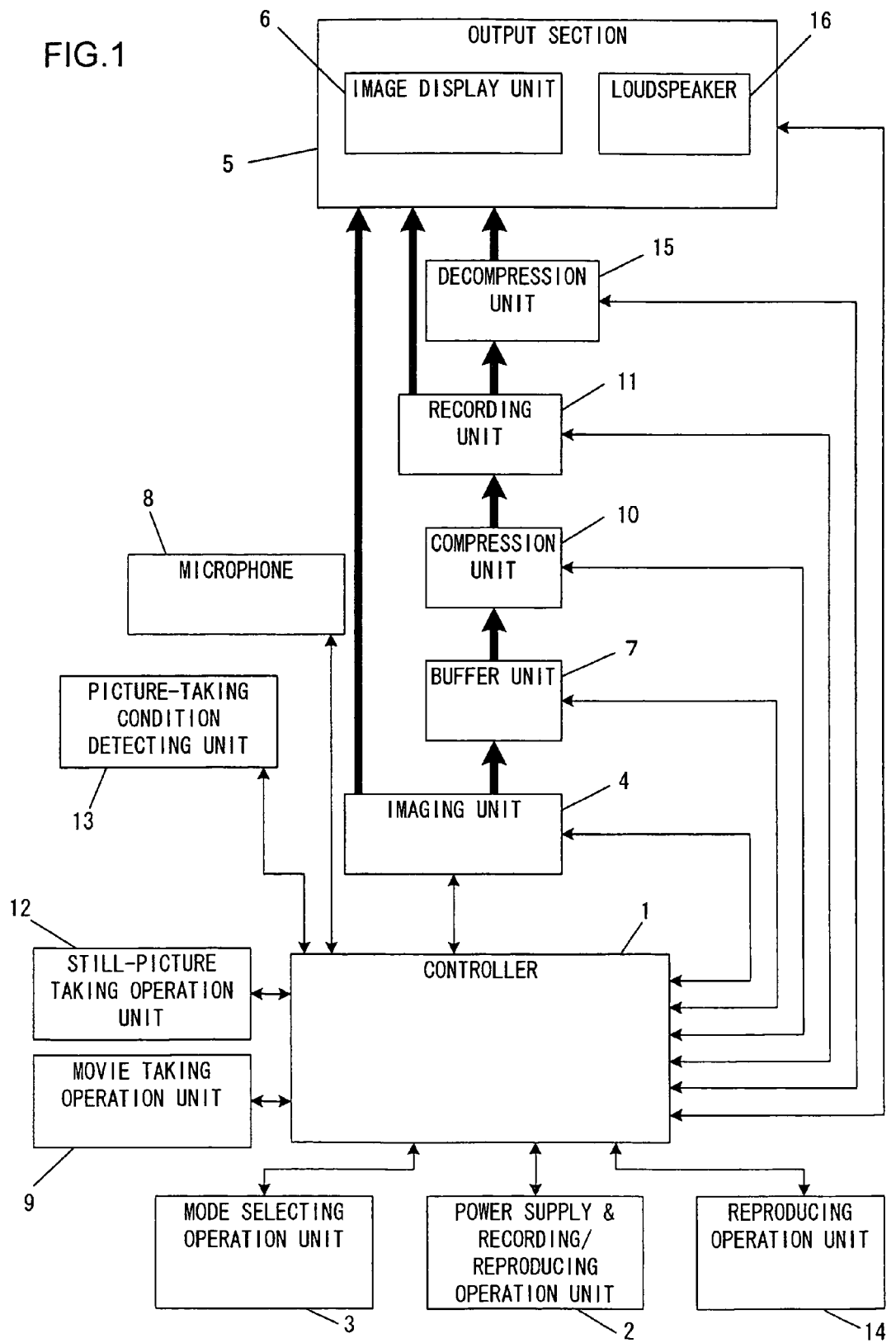
FIG. 1 is a block diagram showing an embodiment of the invention in the form of a camera capable of taking a movie.
Figure 2:
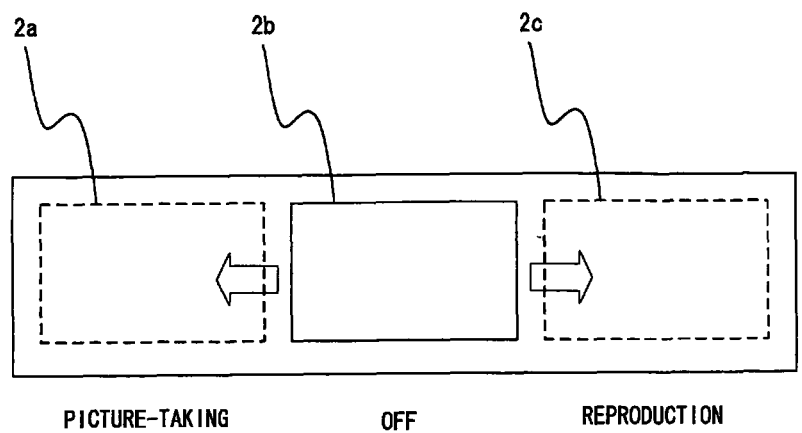
FIG. 2 is a front view showing one example of detailed structure of a power supply & recording/reproducing operation unit.

FIG. 1 is a block diagram of a camera (imaging apparatus) capable of taking a movie according to a preferred embodiment of the invention. A controller 1 has control over the functions of the overall system. A power-supply & recording/reproducing operation unit 2 is a manual operation unit that is manually operated to turn on/off a power supply and switch the camera between a recording mode and a reproduction (play back) mode. One example of its detailed structure is illustrated in FIG. 2 that will be described later. A manual operation unit 3 is adapted to be manually operated to switch the operating mode of the camera to a selected one of various modes as indicated in FIG. 3 that will be described in detail later, while permitting entry of various signals.

When the power-supply & recording/reproducing operation unit 2 is operated to turn on the power supply in the recording mode, an imaging unit 4 starts capturing images, and a movie (moving images) taken by the imaging unit 4 are displayed on an image display unit 6 of an output section 5. In this embodiment, the image display unit 6 consists of an electronic viewfinder in the form of a liquid crystal display, or the like, and is provided on the back of the camera. At the same time, movie (moving image) data captured by the imaging unit 4 is stored into a buffer unit 7. The buffer unit 7 is able to retain or hold movie data for a predetermined period of time, for example, 10 seconds, and data stored in the buffer unit 7 is sequentially replaced with new data upon each lapse of 10 seconds. Thus, movie data of the last 10 seconds is always stored in the buffer unit 7. When the power supply is turned on in the recording mode, acquisition of voice data via a microphone 8 is also started concurrently with acquisition of image data, and the voice data thus acquired is stored into the buffer unit 7 while being associated with the corresponding movie data. Like the movie data, the voice data of the last 10 seconds is always stored in the buffer unit 7.

When a movie taking operation unit 9 is operated, taking of a movie is started, and movie data stored in the buffer unit 7 is compressed in a movie compression mode at a compression unit 10 and recorded in a recording unit 11. At the same time, voice data stored in the buffer unit 7 is also compressed in accordance with compression of movie data, and is recorded in the recording unit 11. The manners of adopting and compressing the movie (moving images) data and voice data stored in the buffer unit 7 vary among picture-taking modes, details of which will be described later.

When a still-picture taking operation unit 12 is operated, still image data captured from the imaging unit 4 into the buffer unit 7 at the time of the operation is compressed in a still-image compression mode at the compression unit 10, and is recorded in the recording unit 11. The normal recording of still images is not the only function performed when the still-picture taking operation unit 12 is operated. Rather, the camera may operate in various picture-taking modes as described later when the still-picture taking operation unit 12 is operated. For example, the still-picture taking operation unit 12 may be operated so as to record a short movie of a predetermined time, e.g., 15 seconds, or the still-picture taking operation unit 12 may be operated during movie taking or reproduction of a movie so as to add a still-picture timing signal into movie data for recording.

The still-picture timing signal added to and recorded with movie data during movie taking is not only generated in response to a manual operation with the still-picture taking operation unit 12 as described above, but may also be automatically generated in accordance with a change in movie taking conditions, such as a change in the brightness of a subject field based on image data from the imaging unit 4, a change of a scene detected through an analysis of image data, or a change in the sound of the subject field detected based on a signal from the microphone 8. The camera of this embodiment is provided with a picture-taking condition detecting unit 13 for automatically generating still-picture timing signals according to changes in movie taking conditions. The picture-taking condition detecting unit 13 includes a plurality of detectors adapted to detect, for example, a change in the photographer's line of sight or vision, a change in the amount of sweat on the photographer's hand holding the camera, a change in a biometric signal, such as the photographer's brain waves, a change in the orientation of the camera, and a change in the acceleration applied to the camera.

Furthermore, a timing-signal button (not shown) provided in the manual operation unit 3 may be operated during movie taking, so that timing signals for chapters are added, for recording, into the movie data.

When the power-supply & recording/reproducing operation unit 2 is operated to switch to the reproduction mode, and a reproducing operation unit 14 is operated to generate a reproduction command, thumbnail data from the recording unit 11 is displayed on the image display unit 6. Then, if one of the thumbnails is selected with the reproducing operation unit 14, image data received from the recording unit 11 is decompressed by a decompression unit 15, and the resulting image is outputted to the image display unit 6 while voice data, if any, is outputted to a loudspeaker 16. The reproduction mode also includes various modes, from which a desired mode is selected with the mode selecting operation unit 3.

FIG. 2 is a front view showing one example of the detailed structure of the power-supply & recording/reproducing operation unit 2. The power-supply & recording/reproducing operation unit 2 has a slidable operating button 2a. In FIG. 2, the operating button 2a is placed in a power-off position. When the operating button 2a is slid or moved to position 2b indicated by a broken line in FIG. 2, the power supply is turned on, and the camera starts operating in the picture-taking mode. When the operating button 2a is slid to position 2c indicated by a broken line in FIG. 2, on the other hand, the power supply is turned on, and the camera starts operating in the reproduction (playback) mode. It is to be understood that the power-supply & recording/reproducing operation unit 2 is not limited to the structure as shown in FIG. 2, but may consist of an ON/OFF button for the power supply, and a mode switching button for switching between the picture-taking mode and the reproduction mode.

FIG. 3 is an explanatory figure showing details of the picture-taking mode and the reproduction mode. In FIG. 3, the operating modes are roughly divided into the "picture-taking (or shooting)" mode and the "reproduction" mode, and the "picture-taking" mode is further divided into five modes including a "simple still-picture" mode. In this specification, the "simple still-picture" mode as one type of the "picture-taking" mode, for example, will be called "simple still-picture taking mode", for the sake of convenience in explanation, and the other modes, including modes into which the reproduction mode is further divided, will be called in a similar way in the following explanation of the table of FIG. 3.

In the "simple still-picture taking mode", a still-frame picture is taken at a point in time at which the still-picture taking operation unit 12 is operated, and a "still-image compression" mode is employed as an image recording method in the compression unit 10. In this mode, voice data may be concurrently recorded during a period from several seconds before the time of still-picture taking to several seconds after the time of still-picture taking, to provide still image data accompanied by voice.

During movie taking or video recording, the operating mode of the camera may be switched to the "simple still-picture taking mode" so as to take a still picture (image). In this case, compressed still image data representing the still picture is recorded, and a still-picture timing signal indicative of a point in time at which the still-picture taking operation unit 12 is operated is recorded into compressed movie data obtained through movie taking.

In "short-movie taking mode", when the still-picture taking operation unit 12 is operated, a short movie of a predetermined time preceding and following the operation of the still-picture taking operation unit 12 is recorded. For example, the short movie is recorded over a total of 15 seconds, starting 7 seconds before the operation of the still-picture taking operation unit 12 and ending 8 seconds after the operation. The length of the total time and the proportion of a pre-operation period and a post-operation period into which the total time is divided may be selected and set in advance. The pre-operation time may be set up to the limit of the capacity of the buffer unit 7, for example, up to 10 seconds. Also, the total time of a short movie may be entirely assigned to the post-operation period following the operation of the still-picture taking operation unit 12, in other words, creation of a short movie of a predetermined time may be started from a point in time at which the still-picture taking operation unit 12 is operated. In this mode, a "movie compression" mode is employed as an image recording method in the compression unit 10, and a movie accompanied by voice are recorded. In addition, a still-picture timing signal is added to and recorded with compressed movie data.

In a "simple movie taking mode", a movie (moving-picture images) is recorded when the movie taking operation unit 9 is operated. In this mode, movie taking is started from movie data captured from the imaging unit 4 into the buffer unit 7 at the time when the movie taking operation unit 9 is operated. Also, in the "simple movie taking mode", a picture-taking-operation timing signal indicative of a point in time at which the movie taking operation unit 9 is operated is added to and recorded with movie data. In the "simple movie taking mode", the "movie compression" mode is employed as an image recording method in the compression unit 10, and a voice-accompanied movie is recorded.

If the picture-taking mode is switched to the "simple still-picture taking mode" during taking of a movie while the camera is in the "simple movie taking mode", still pictures can be taken in the "simple still-picture taking mode" while movie taking or video recording is being continued.

In a "movie/manual still-picture taking mode", a movie is taken, and a still-frame picture is taken by a manual operation during the movie taking. In the "movie/manual still-picture taking mode", it is possible to take a still-frame picture during movie taking, without switching the picture-taking mode to the "simple still-picture taking mode", unlike the case of the "simple movie taking mode".

Movie data recorded during movie taking is obtained by connecting or joining voice-accompanied movie data obtained from the time when the movie taking operation unit 9 is operated, to the entire voice-accompanied movie data stored or retained in the buffer unit 7 at the time when the movie taking operation unit 9 is operated. For example, if movie data is stored in the buffer unit 7 to the full capacity thereof, movie data starting from a time point that is 10 seconds ahead of the operating timing of the movie taking operation unit 9 is recorded. In this mode, the "movie compression" mode is employed as an image recording method in the compression unit 10. In the "movie/manual still-picture taking mode", a picture-taking-operation timing signal indicative of the time at which the movie taking operation unit 9 is operated is added to and recorded with the movie data, as in the "simple movie taking mode".

When a still-frame picture is taken, on the other hand, compressed still image data is not created, but only a still-picture timing signal is produced, and is added to and recorded with voice-accompanied movie data, unlike the case of the "simple still-picture taking mode".

When a movie is taken in the "movie/manual still-picture taking mode", compressed movie data for a given period of time between a time point that is several seconds ahead of the time of generation of a still-picture timing signal and a time point that is several seconds behind the time of generation, and compressed movie data for the other time periods, are created while being discriminated or distinguished from each other. While these compressed movie data provide continuous movie data, respective pieces of the movie data are created independently of each other; therefore, two or more pieces of compressed movie data, rather than a single piece of compressed movie data, are created between the start of the movie taking and the end thereof.

The "movie/automatic still-picture taking mode" provides the same functions as the "movie/manual still-picture taking mode", to which an automatic still-picture taking function is further added. Namely, not only where a still-picture timing signal is generated when the still-picture taking operation unit 12 is operated during movie taking, but also where a still-picture timing signal is automatically generated in response to a change in the movie taking conditions, the still-picture timing signal is added to and recorded with voice-accompanied compressed movie data. In this mode, the "movie compression" mode is employed as an image recording method in the compression unit 10.

Switching among the above-indicated picture-taking modes may be effected by operating the mode selecting operation unit 3, or may also be effected by operating the movie taking operation unit 9. For example, if the movie taking operation unit 12 is operated when the camera is in the "simple still-picture taking mode", the operating mode of the camera is changed to one of the "simple movie taking mode", "movie/manual still-picture taking mode", and the "movie/automatic still-picture taking mode". It is possible to set in advance the movie taking mode to which the operating mode of the camera is switched when the movie taking operation unit 12 is operated.

While the "picture-taking modes" have been briefly explained above, the "reproduction modes" will be now explained.

In a "still-image reproduction mode", a still image is reproduced when the reproducing operation unit 14 is operated. In this mode, a still image may be reproduced based on compressed still image data recorded in the "simple still-picture taking mode". In addition, a still image may also be reproduced based on compressed movie data, on the basis of a still-picture timing signal added to the compressed movie data, such that the still image coincides with the time of generation of the still-picture timing signal.

In a "voice-accompanied still-image reproduction mode", a still image accompanied by voice is reproduced when the reproducing operation unit 14 is operated. In this mode, reproduction is performed based on voice-accompanied movie data recorded in the "short-movie taking mode". More specifically, a still image based on a recorded still-picture timing signal is reproduced along with voice of a short-movie period based on compressed movie data. Similar reproduction may be performed by utilizing respective still-picture timing signals, based on voice-accompanied, compressed movie data recorded in the "movie/manual still-picture taking mode" or the "movie/automatic still-picture taking mode". In the "voice-accompanied still-image reproduction mode", instead of creating a still image based on compressed movie data each time the reproducing operation unit 14 is operated as described above, a still image, once it is specified through an editing operation as described later, may be re-recorded along with voice data associated with the still image, to provide voice-accompanied, compressed still image data, and then the voice-accompanied, compressed still image data may be directly reproduced when the reproducing operation unit 14 is operated. The editing operation makes it possible to create voice-accompanied, compressed still image data not only from the voice-accompanied, compressed movie data recorded in the "short-movie taking mode", but also from the voice-accompanied, compressed movie data recorded in the "simple movie taking mode", "movie/manual still-picture taking mode" or the "movie/automatic still-picture taking mode". Furthermore, in the "voice-accompanied still-image reproduction mode", voice-accompanied, compressed still image data recorded in the "simple still-picture taking mode" can be reproduced, as a matter of course, when the reproducing operation unit 14 is operated.

In a "short-movie reproduction mode", reproduction is performed based on voice-accompanied movie data recorded in the "short-movie taking mode" when the reproducing operation unit 14 is operated.

In a "highlight movie reproduction mode", voice-accompanied, compressed movie data recorded in the "movie/manual still-picture taking mode" or the "movie/automatic still-picture taking mode" is reproduced. In the "highlight movie reproduction mode", a movie is not reproduced by reproducing the full length of the recorded movie data, but only some pieces of movie data are selected and read from the recorded movie data, and joined together so that these pieces of movie data are continuously reproduced. The selected pieces of movie data may include movie data spanning a given period of time set with reference to the operation timing of the movie taking operation unit 9, and movie data spanning a given period of time set with reference to a still-picture timing signal, for example, movie data corresponding to a total of 20 seconds consisting of 10 seconds before the still-picture timing signal and 10 seconds after the still-picture timing signal.

In a "simple movie reproduction mode", the full length of voice-accompanied, compressed movie data recorded in the "simple movie taking mode", "movie/manual still-picture taking mode" or the "movie/automatic still-picture taking mode" is reproduced.

In any of the movie reproduction modes, if the still-picture taking operation unit 12 is operated during reproduction of a movie, a still-picture timing signal is added to the movie data.

FIG. 4 is a flowchart illustrating an operation of the controller 1 in the embodiment shown in FIG. 1, more specifically, an operation performed when the power supply is switched from the OFF state to the ON state. While the power supply is turned on or turned off by means of the power-supply & recording/reproducing operation unit 2, the power supply is also turned off via a circuit designed for power saving when the camera is kept in a non-operated state for a certain period of time even if the operating button 2a is placed in the ON position 2b or 2c of FIG. 2. To turn on the power supply from this condition, the power-supply & recording/reproducing operation unit 2 may be once returned to the OFF position and then brought back to the ON position.

The power supply may also be placed in the ON state again, by operating an other operation unit, such as the mode selecting operation unit 3, movie taking operation unit 9, still-picture taking operation unit 12, or the reproducing operation unit 14.

Once the control flow of FIG. 4 starts, the controller 1 waits in step S1 until the power supply is placed in the ON state in any of the manners as described above. If the ON state is detected, the control proceeds to step S2 to reset and start a non-operation timer. The non-operation timer is reset again at a point in time at which any operation is performed by the user in a later step, and starts counting from that point in time. Next, in step S3, the controller 1 checks whether the operating mode of the camera is the picture-taking mode, namely, whether the operation button of FIG. 2 is placed in the position 2b.

If it is determined in step S3 that the camera is in the picture-taking mode, the control proceeds to step S4 to set the picture-taking mode to the initial value. Setting of the picture-taking mode may be stored even after the power supply is turned off. If there is any mode that was set in the previous cycle, this mode is retrieved and set as the initial value. If no setting is stored, the picture-taking mode is set by default to the "movie/automatic still-picture taking mode" in step S4. Next, in step S5, the controller 1 permits a picture-taking mode selecting operation, and allows the mode selecting operation unit 3 to be operated to change the picture-taking mode to a mode other than the initial value.

In step S6, an image capture starting process as described later is performed, in which capturing of images by the imaging unit 4, display of the images on the image display unit 6, and storage of movie data into the buffer unit 7 are started. Subsequently, movie taking operations are allowed to be accepted in step S7, and still-picture taking operations are allowed to be accepted in step S8. As a result, a movie or a still picture can be taken when the movie taking operation unit 9 or the still-picture taking operation unit 12 is operated.

In step S9, an operation to turn off the power supply is allowed to be accepted, so that the camera can be turned off when the operating button 2 of the power-supply & recording/reproducing operation unit 2 is operated. Then, in step S10, the controller 1 checks whether the camera has been kept in the non-operated state for a predetermined time since the no-operation timer started. If the predetermined time has elapsed and the timer expires, the control proceeds to step S11 to turn off the power supply via a circuit, and returns to step S1.

If, on the other hand, it is determined in step S3 that the camera is not in the picture-taking mode but in the reproduction mode, reproduction-mode initial display processing is performed in which the initial screen is displayed on the image display unit 6. The initial screen may be, for example, a user interface screen associated with an operation of the mode selecting operation unit 3 or the reproducing operation unit 14. Next, in step S13, a reproduction mode selecting operation is allowed to be accepted, namely, the mode selecting operation unit 3 is allowed to be operated to select a mode from the above-indicated reproduction modes. Further, in step S14, a reproducing operation is allowed to be accepted, namely, the reproducing operation unit 14 is allowed to be operated to perform are producing operation, and the control proceeds to step S9.

Figure 5:
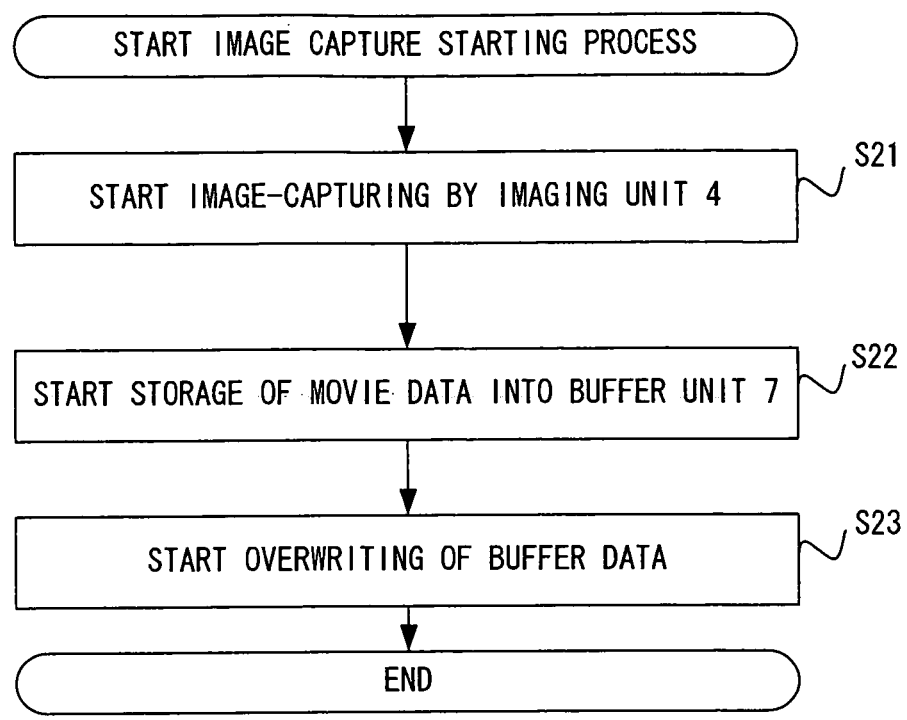
FIG. 5 is a flowchart illustrating details of an image capture starting process in step S6 of FIG. 4.

FIG. 5 is a flowchart illustrating details of the image capture starting process in step S6 of FIG. 4. Upon start of the flow, capturing of images by the imaging unit 4 is started. Then, in step S22, storage of voice-accompanied movie data into the buffer unit 7 is started. Further, in step S23, an operation to sequentially overwrite data stored in the buffer unit 7 (in the following, "data stored in the buffer unit 7" may be called "buffer data") upon a lapse of a predetermined time, e.g., 10 seconds, from the start of image capturing, with data newly received from the imaging unit 4 is started, and the control proceeds to step S7.

Figure 6:
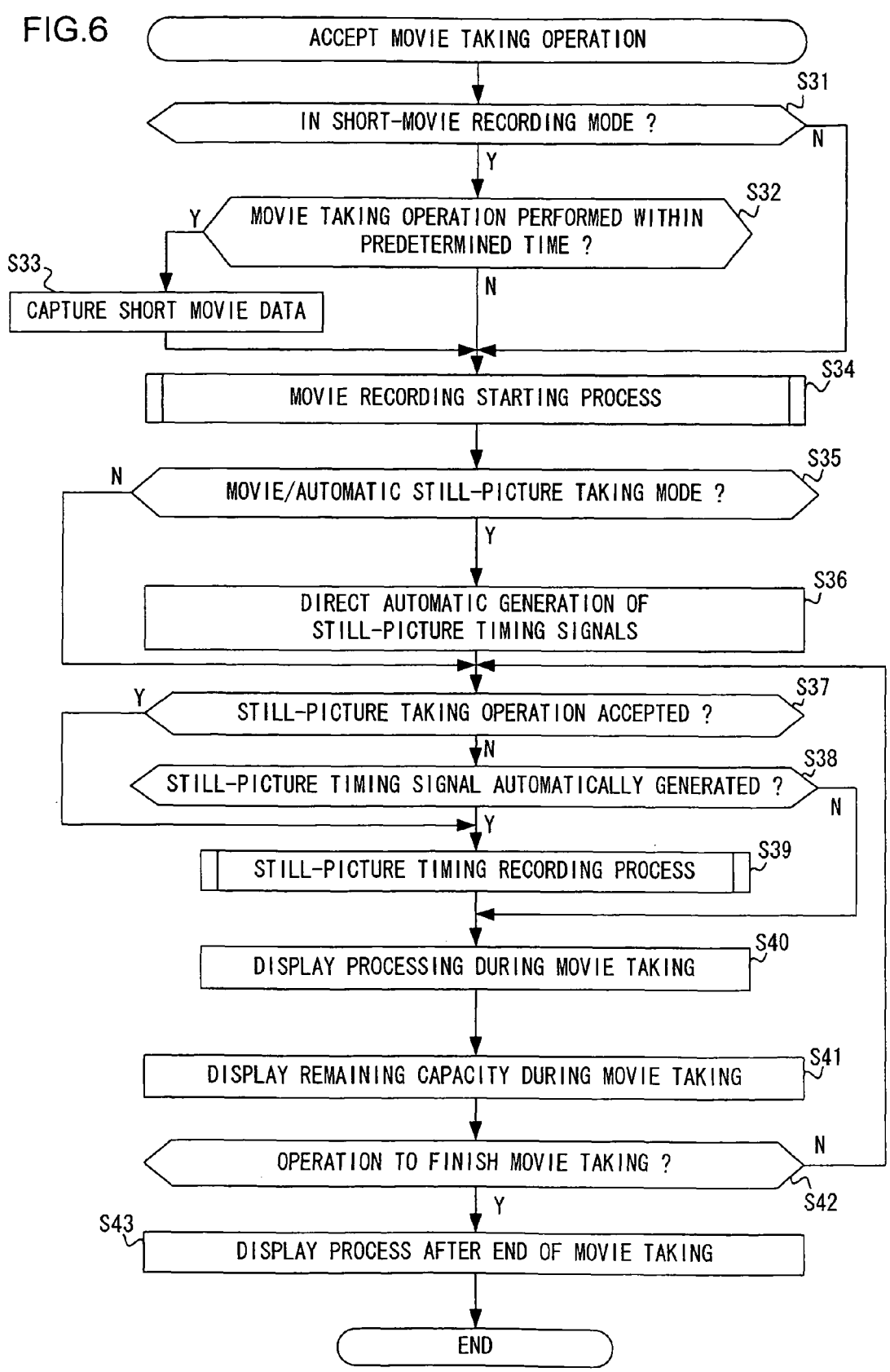
FIG. 6 shows the flow of movie taking which starts when a movie taking operation unit is operated while its operation is allowed to be accepted in step S7 of FIG. 4.

FIG. 6 illustrates the flow of movie taking that starts when the movie taking operation unit 9, whose operation is allowed to be accepted in step S7 of FIG. 4, is operated. When a movie taking operation is accepted, the operating mode of the camera is set to one of the "simple movie taking mode", "movie/manual still-picture taking mode" and the "movie/automatic still-picture taking mode", and the flow starts. Upon start of the flow, it is first determined in step S31 whether the operating mode of the camera had been set to the "short-movie taking mode" before the movie taking operation was accepted. If it is determined in step S31 that the operating mode had been set to the "short-moving taking mode", the control proceeds to step S32.

In step S32, it is determined whether the movie taking operation unit 9 was operated within a predetermined time after the still-picture taking operation unit 12 was operated while the camera was in the "short-movie taking mode". If an affirmative decision (YES) is obtained in step S32, the control proceeds to step S33 to prepare for processing for creating movie data by seamlessly joining or connecting short movie data captured in the short-movie taking mode to movie data captured in the movie taking mode. Then, the control proceeds to step S34 to perform a movie recording starting process. Details of step S34 will be described later.

In the "simple movie taking mode", the predetermined time used in step S32 corresponds to a set recording time after the still-picture taking operation unit 12 is operated while the camera is in the "short-movie taking mode". In the "movie/manual still-picture taking mode" or the "movie/automatic still-picture taking mode", the predetermined time used in step S32 is equal to the sum of the set recording time after the still-picture taking operation unit 12 is operated and the time period of a voice-accompanied movie stored in the buffer unit 7. Which of the above-indicated time periods is used as the predetermined time is automatically determined by determining the picture-taking mode in step S32. This operation will be described in detail later with reference to FIG. 8.

If it is determined in step S31 that the camera was not in the "short-movie taking mode", the control proceeds from step S31 directly to step S34. Also, if it is determined in step S32 that the movie taking operation unit 9 was not operated within the predetermined time after the still-picture taking operation unit 12 was operated, the control proceeds from step S32 directly to step S34.

After the process of step S34, the control proceeds to step S35 to check whether the "movie/automatic still-picture taking mode" is established. If an affirmative decision (YES) is obtained in step S35, the control proceeds to step S36 to perform processing for directing automatic generation of still-picture timing signals, and then proceeds to step S37. If a negative decision (NO) is obtained in step S35, the control proceeds from step S35 directly to step S37.

In step S37, it is determined whether the controller 1 has accepted or received an operation of the still-picture taking operation unit 12. If not, the control proceeds to step S38 to check whether a still-picture timing signal has been automatically generated. If a still-picture timing signal has been automatically generated, the control proceeds to step S39 to perform a still-picture timing recording process. Step S39 will be described in detail later.

If the controller 1 has accepted an operation of the still-picture taking operation unit 12 in step S37, a still-picture timing signal is generated based on this operation; therefore, the control directly proceeds to step S39 to perform the still-picture timing recording process.

In either case, the control proceeds to step S40 once the above process is completed. If no still-picture timing signal is generated until the control reaches step S38, the still-picture timing recording process need not be performed, and thus the control directly proceeds to step S40.

In step S40, processing to be executed during movie taking for display on the image display unit 6 is performed. Details of the processing in step S40 will be described later. In the following step S41, processing for displaying the remaining capacity of the recording unit 11 during movie taking is performed.

When the processing of step S41 is finished, the control proceeds to step S42 to check whether the movie taking operation unit 9 has been operated to finish movie taking. If the operation has been performed, the control proceeds to step S43 to perform a display process after the end of movie taking. When the process is finished, the movie taking process ends.

On the other hand, if it is determined in step S42 that an operation to finish movie taking has not been performed, the control returns to step S37 to continue movie taking.

Figure 7:
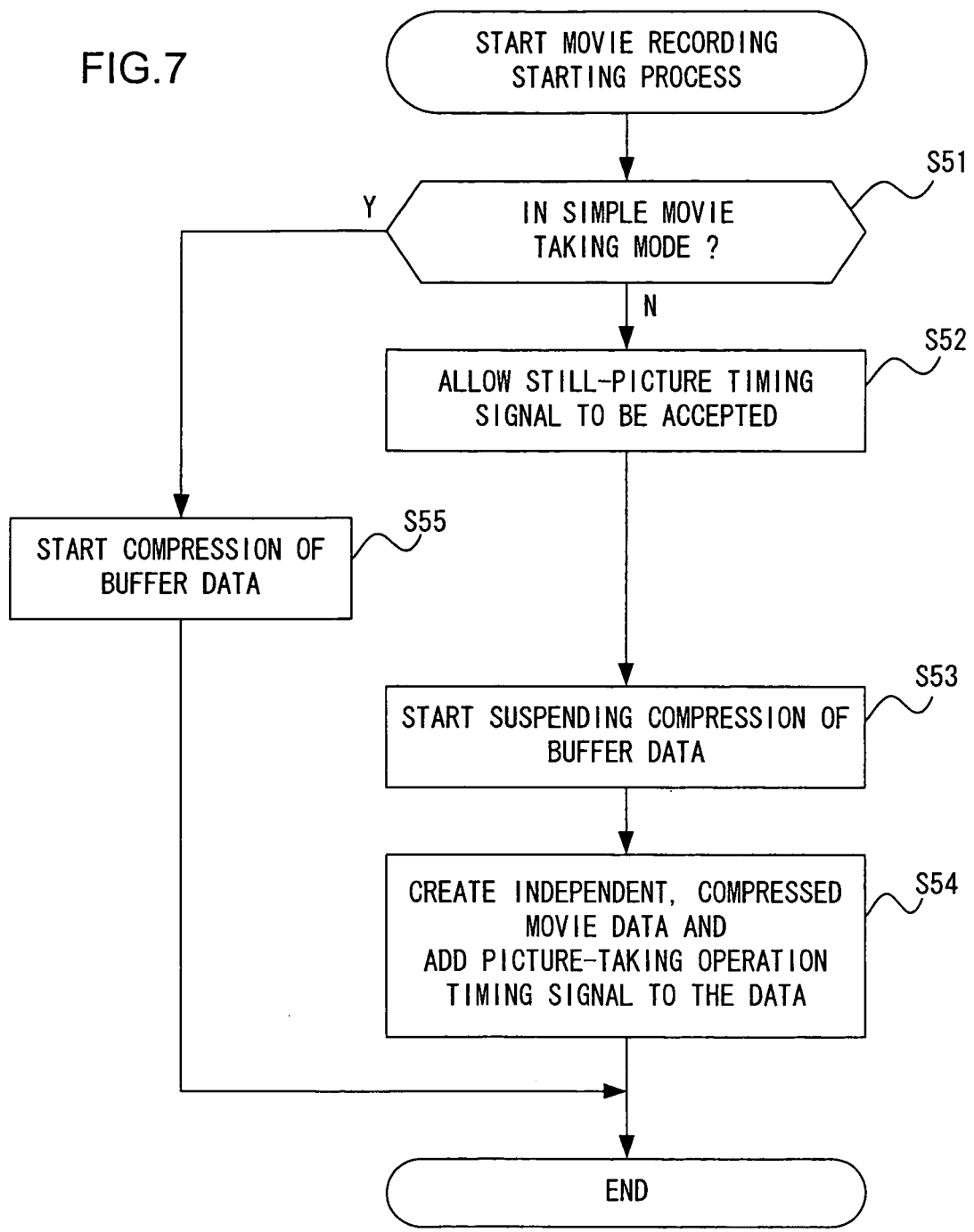
FIG. 7 is a flowchart illustrating the content of a movie recording starting process in step S34 of FIG. 6.

FIG. 7 is a flowchart illustrating the content of the movie recording starting process in step S34 of FIG. 6. Upon start of the process, it is determined in step S51 whether the camera is in the "simple movie taking mode". If not, the camera is in either the "movie/manual still-picture taking mode" or "movie/automatic still-picture taking mode". In this case, the control proceeds to step S52 to allow the controller 1 to accept a still-picture timing signal.

Next, the control proceeds to step S53 to start processing for suspending or holding an operation to compress buffer data until a predetermined time (e.g., 10 seconds) elapses from the start of picture taking or until a still-picture timing signal is received. In the "movie/manual still-picture taking mode" or the "movie/automatic still-picture taking mode", voice-accompanied image data stored in the buffer unit 7 at the time of start of picture taking needs to be joined or connected to voice-accompanied image data captured from the start of picture taking, to provide movie data to be recorded. Therefore, the buffer-data compressing operation is suspended or put on hold in step S53.

Upon a lapse of the suspension or holding time of the buffer-data compressing operation has elapsed, the control proceeds to step S54 to create an independent piece of compressed movie data by compressing movie data spanning a given period of time set with reference to the picture-taking timing of the movie taking operation unit 9, while adding a picture-taking operation timing signal to the movie data, to finish the movie recording starting process. Then, the control proceeds to step S35 of FIG. 6. The compressed movie data spanning the given time period set with reference to the time of movie taking is created in step S54, because the photographer is most interested in images immediately before and after the start of movie taking, and the images during this period are to be reproduced in the highlight movie reproduction mode. Also, the information on the picture-taking operation timing signal of the movie taking operation unit 9 is added to the movie file, so that the movie immediately before and after the start of movie taking can be handled in a manner similar to short-movie recording.

If, on the other hand, it is determined in step S51 that the camera is in the "simple movie taking mode", the control proceeds to step S55 to start the buffer-data compressing operation immediately after the movie taking operation unit 9 is operated, and finishes the movie recording starting process. The control then proceeds to step S35 of FIG. 6.

Figure 8:
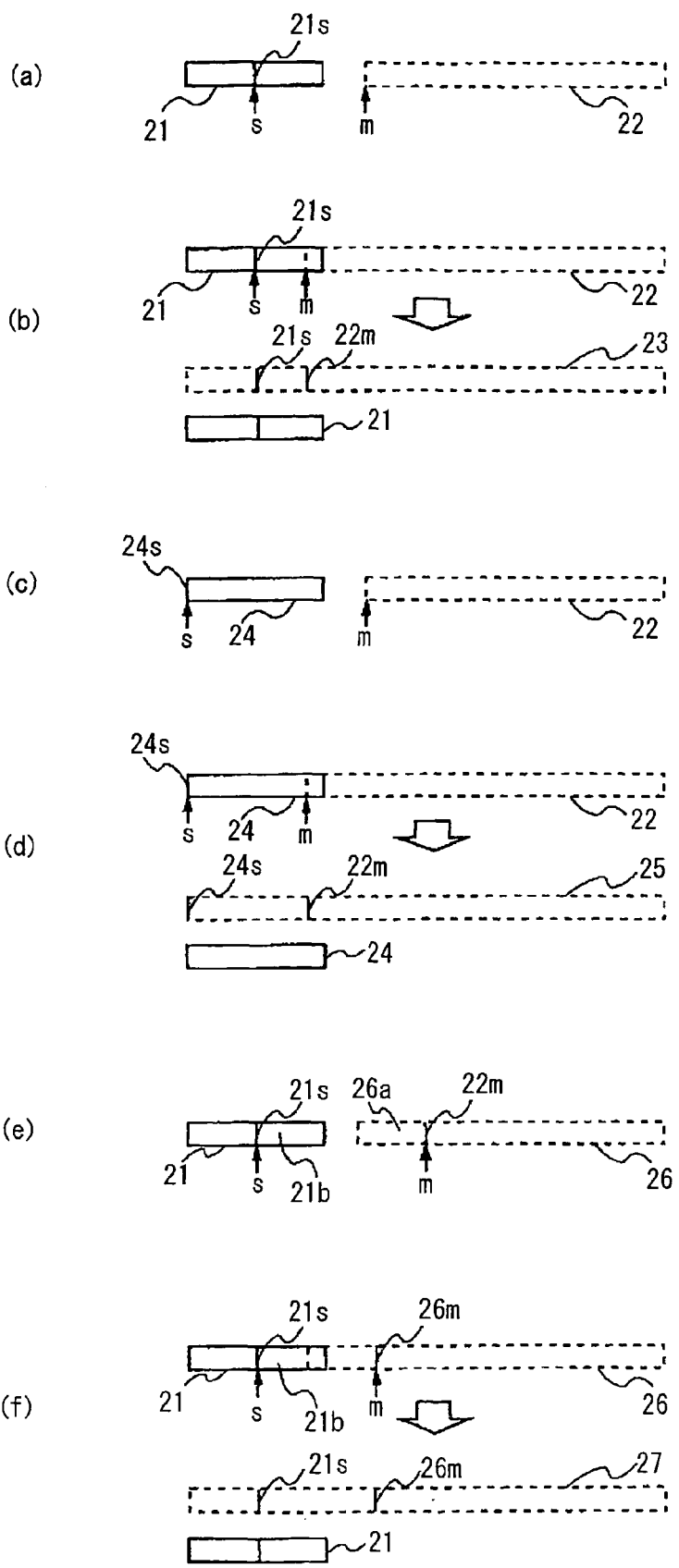
FIG. 8 shows timing charts useful for explaining step S32 through step S34 in the flow of FIG. 6 and the functions of FIG. 7.

FIG. 8 shows timing charts useful for explaining step S32 through step S34 of the flow of FIG. 6 and the functions of FIG. 7, and the timing charts are plotted with the time axis along which time proceeds from left to right as viewed in FIG. 8. In FIG. 8, arrow "s" indicates the operating timing of the still-picture taking operation unit 12, and arrow "m" indicates the operating timing of the movie taking operation unit 9. In the following explanation, a period of time from the time when the still-picture taking operation unit 12 is operated while the camera is set in the "short-movie taking mode" to the time when recording of the short movie is finished will be called "latter-half time".

In FIG. 8, (a) and (b) show the cases where the movie taking operation unit 9 is operated in the "simple movie taking mode" after the still-picture taking operation unit 12 is operated in the "short-movie taking mode". FIG. 8(*a*) corresponds to the case where the control proceeds from step S32 directly to step S34 in FIG. 6, and proceeds from step S51 to step S55 in FIG. 7. Namely, movie taking is started in the "simple movie taking mode" after a lapse of the latter-half time from the still-picture taking operation timings, namely, after a lapse of a time period for short-moving recording. Therefore, the short movie and the movie are not connected to each other, and are respectively recorded as independent movie files.

On the other hand, FIG. 8(*b*) corresponds to the case where the control proceeds from step S32 to step S34 via step S33 in FIG. 6, and proceeds from step S51 to step S55 in FIG. 7 showing the content of step S34. Namely, the movie taking is started at time m in the "simple movie taking mode" before a lapse of the latter-half time after the still-picture taking operation timing s, i.e., before expiration of the time period for short-moving recording. In this case, a movie file 23 is created by seamlessly connecting the short movie to the a movie. A still-picture timing signal 21*s* indicative of the time at which the still-picture taking operation unit 12 is operated and a picture-taking operation timing signal 22*m* indicative of the time at which the movie taking operation unit 9 is operated are added to the movie file 23. These timing signals 21*s*, 22*m* provide information as to whether the movie taking operation unit 9 was operated within a predetermined time after the still-picture taking operation unit 12 was operated. In addition, a short movie 21 of exactly the original time period is independently created.

In FIG. 8, (c) and (d) show the cases that are identical with the cases of (a) and (b) in terms of the mode and the flow, but are different from these cases in that the time period before the still-picture taking operation timing in the "short-moving taking mode" is set to zero. In the case of FIG. 8(*c*), movie taking in the "simple movie taking mode" is started at time m after a lapse of the latter-half time, after the still-picture taking operation timing s; therefore, the resulting short movie 24 and a movie 22 are not connected to each other, but are respectively recorded as independent movie files. In the case of FIG. 8(*d*), on the other hand, movie taking in the "simple movie taking mode" is started at time m before a lapse of the latter-half time after the still-picture taking operation timing s, namely, before expiration of the time period for short-movie recording; therefore, a movie file 25 is created by seamlessly connecting a short movie 24 to a movie 22. Like the movie file 23, a still-picture timing signal 24*s* and a picture-taking operation timing signal 22*m* are added to the movie file 25.

In any of the cases of (a), (b), (c), (d) of FIG. 8, a determination as to whether the short movie 21, 24 and the movie 22 are seamlessly connected to each other is made depending on the result of checking in step S32 of FIG. 6, namely, whether movie taking is started within a predetermined time after the still-picture taking operation timing s.

In FIG. 8, (e) and (f) show the cases where the movie taking operation unit 9 is operated in the "movie/manual still-picture taking mode" or the "movie/automatic still-picture taking mode" after the still-picture taking operation unit 12 is operated in the "short-movie taking mode". In the cases of (e) and (f) of FIG. 8, the "predetermined time" in step S32 of FIG. 6 is the sum of a time period 21*b* (the latter-half time) in the short movie after the operating timing of the still-picture taking operation unit 12, and a time period 26*a* before the operating timing m of the movie taking operation unit 9. The time period 26*a* corresponds to the length of time of a voice-accompanied movie which is stored in the buffer unit 7 and for which the compressing operation is suspended. In the "movie/manual still-picture taking mode" or the "movie/automatic still-picture taking mode", movie data of this time period before the operating timing m of the movie taking operation unit 9 is also incorporated into a movie file 26.

FIG. 8(*e*) corresponds to the case where the control proceeds from step S32 directly to step S34 in FIG. 6, and proceeds from step S51 to step S53 via step S52 in FIG. 7. In the case of FIG. 8(*e*), the movie taking operation unit 9 is operated at time m after a period of time that is longer than the sum of the time period 21*b* and the time period 24*a* elapses after the operating timing s of the still-picture taking operation unit 12; therefore, the short movie 21 and the movie 26 are not connected to each other. Accordingly, the short movie 21 and the a movie 26 are respectively recorded as independent movie files.

On the other hand, FIG. 8(*f*) corresponds to the case where the control proceeds from step S32 to step S34 via step S33 in FIG. 6, and proceeds from step S51 to step S55 via step S52 in FIG. 7. Namely, the movie taking operation unit 9 is operated at time m within the total period or sum of the time period 21*b* and the time period 24*a*. In this case, the short movie 21 and the movie 26 are seamlessly connected to each other, except an overlapping portion of the time period 21*b* and the time period 24, thereby to create a movie file 27. In addition, the short movie 21 of exactly the original time period is also independently created.

The significance of the functions as explained above with reference to FIG. 8 resides in that, when the user wishes to take a movie during picture taking that was originally started so as to take a still picture(s), a movie file can be created which includes data captured at around the still-picture taking operation, in which the user is particularly interested, and the camera can seamlessly or smoothly shift from the still-picture taking mode to the movie taking mode.

Figure 9:
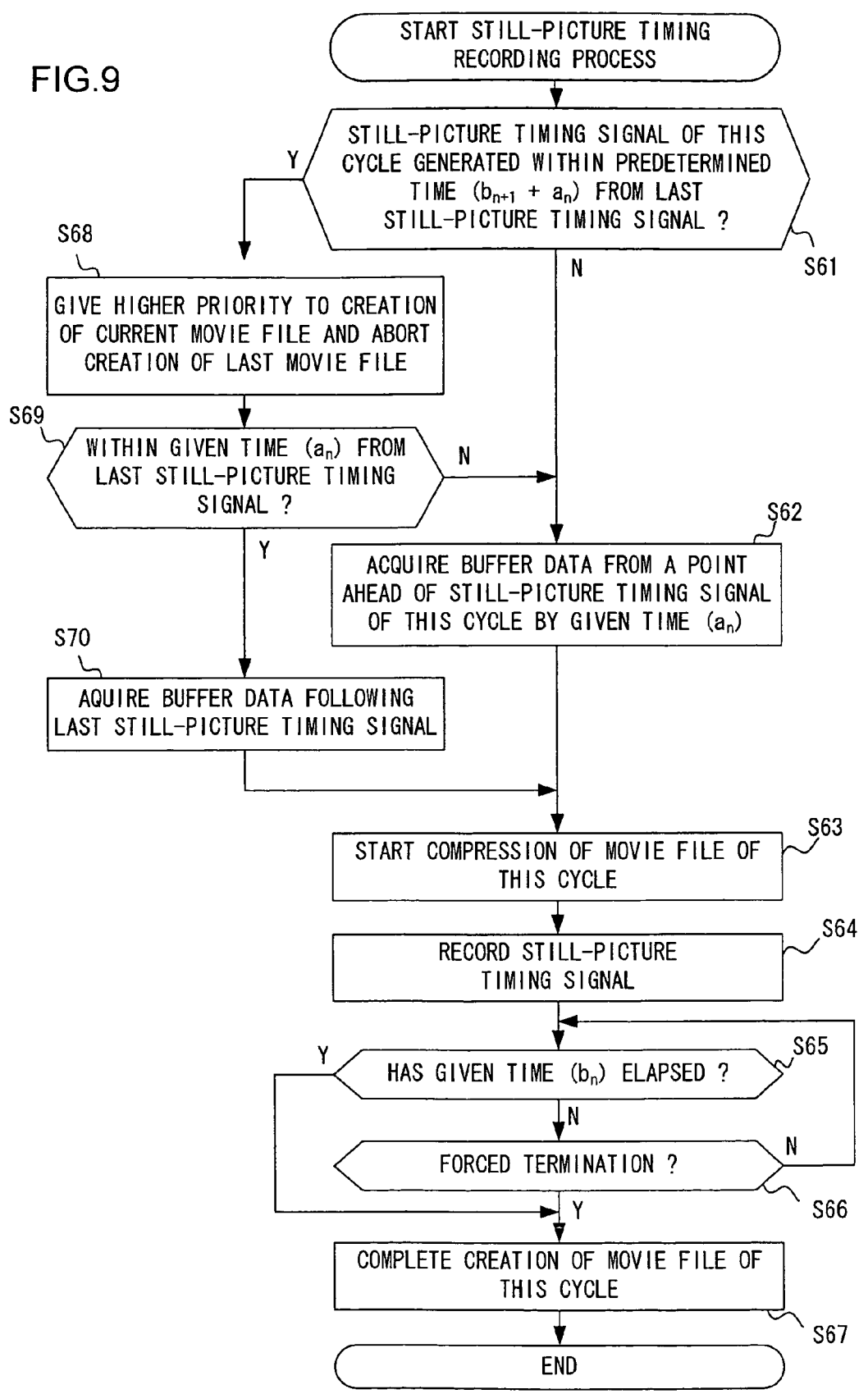
FIG. 9 is a flowchart illustrating the content of a still-picture timing recording process in step S39 of FIG. 6.
Figure 10:
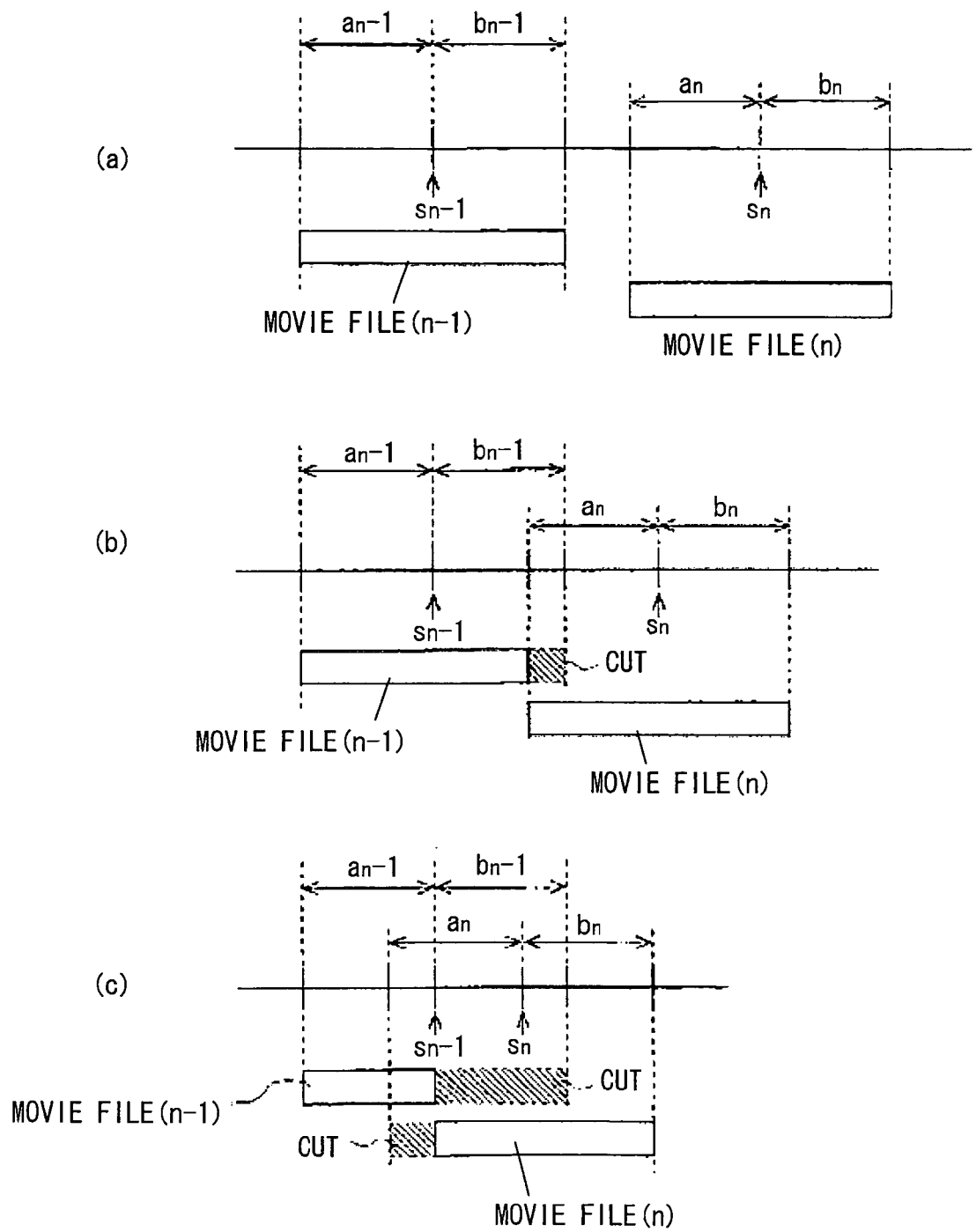
FIG. 10 shows timing charts illustrating the manners of creating movie files in the still-picture timing recording process.

FIG. 9 is a flowchart illustrating the content of the still-picture timing recording process in step S39 of FIG. 6. FIG. 10 shows timing charts showing how movie files are created during the still-picture timing recording process.

Prior to explanation of the flow of FIG. 9, the general outlines of the sill-picture timing recording process will be initially explained. This process is intended to provide still-picture timing signals for use in highlight movie reproduction mode, and a main object of this process is to create independent movie files each representing a movie spanning a given period of time set with reference to a still-picture timing signal, during taking of a movie. This makes it possible to easily extract only the movies spanning the given periods of time set with reference to the respective still-picture timing signals, and connect or join these movie files together for reproduction in the highlight movie reproduction mode. Generally, the recording periods of time before and after the timing of still-picture taking are set equal to the recording periods of time before and after the timing of still-picture taking in the short-movie taking mode, but may be set differently.

When the still-picture timing recording process is started in FIG. 9, it is determined in step S61 whether a still-picture timing signal $s_n$ is generated in this cycle within a predetermined time ($b_{n-1}+a_n$) from generation of a still-picture timing signal $s_{n-1}$ of the last cycle. Here, time a is a predetermined time before the still-picture timing, and time b is a predetermined time after the still-picture timing. Namely, it is determined in step S61 whether the still-picture timing signal $s_n$ of this cycle is generated after time $b_{n-1}$ elapses from generation of the still-picture timing signal $s_{n-1}$ of the last cycle, and time $a_n$ further elapses. In other words, step S61 checks if the still-picture timing signals are generated so close in time to each other that a movie spanning a given period of time set with reference to the still-image timing signal of the last cycle and a movie spanning a given period of time set with reference to the still-image timing signal of this cycle overlap each other.

If it is determined in step S61 that the still-picture timing signal $s_n$ of this cycle is not generated within the predetermined time ($b_{n-1}+a_n$) from generation of the still-picture timing signal $s_{n-1}$ of the last cycle, the control proceeds to step S62 to acquire buffer data starting from a point in time ahead of the time of generation of the sill-picture timing signal $s_n$ by time $a_n$, as shown in FIG. 10(a). In step S63, movie compression of this cycle is started based on the acquired data. In step S64, the still-picture timing signal is recorded into the compressed movie data.

In step S65, it is determined whether time $b_n$ has elapsed from generation of the still-picture timing signal $s_n$ of this cycle. If not, it is determined in step S66 whether the movie taking is forced to be terminated. Unless the movie taking is forced to be terminated, the control returns from step S66 to step S65, and waits for a lapse of time $b_n$ while repeating step S65 and step S66. Upon a lapse of time $b_n$, the control proceeds from step S65 to step S67, completes creation of the movie file of this cycle, and then proceeds to step S40 of FIG. 6.

Here, step S66 is provided for causing the controller 1 to come out of a loop for waiting for a lapse of time $b_n$ and start creation of the next movie file first when the next still-picture timing signal $s_{n+1}$, is received which is close in time to the still-picture timing signal $s_n$ of this cycle. If forced termination is detected in step S66, the control immediately proceeds to step S67 even before the lapse of time $b_n$.

If, on the other hand, the still-picture timing signal $s_n$ of this cycle is generated within the predetermined time ($b_{n-1}+a_n$) from generation of the still-picture timing signal $S_{n-1}$ of the last cycle, the movie spanning the given period of time set with reference to the still-image timing signal of the last cycle and the movie spanning the given period of time set with reference to the still-image timing signal of this cycle overlap each other. In this case, the control proceeds to step S68 to give a higher priority to creation of the movie file of this cycle, and abort creation of the movie file of the last cycle at a starting point of the above-indicated time $a_n$, as shown in FIG. 10(b). As a result, the length of the movie file of the last cycle after the still-picture timing becomes shorter than time $b_{n-1}$, and may become equal to zero at the shortest. It is, however, to be noted that the time period of the movie file of this cycle dos not overlap the time period of the movie file of the last cycle while extending beyond the still-picture timing of the last cycle.

Next, it is determined in step S69 whether the still-picture timing signal $s_n$ of this cycle is generated within time $a_n$ from generation of the still-picture timing signal $s_{n-1}$ of the last cycle. In the case as shown in FIG. 10(b), the still-picture timing signal $s_n$ of this cycle is generated after a lapse of time $a_n$ from generation of the still-picture timing signal $s_{n-1}$ of the last cycle; therefore, the control proceeds to step S62, and starts creating a movie file as usual from a time point ahead of the time of generation of the still-picture timing signal $s_n$ of this cycle by the length of time $a_n$.

If, on the other hand, the still-picture timing signal $s_n$ of this cycle is generated within time $a_n$ from generation of the still-picture timing signal $s_{n-1}$, as shown in FIG. 10(c), the control proceeds to step S70 to abort creation of the movie file of the last cycle at the time of generation of the still-picture timing signal $s_{n-1}$ of the last cycle, and buffer data for use in creation of the movie file of this cycle is acquired from the time of generation of the still-picture timing signal $s_{n-1}$. As a result, the length of a portion of the movie file of the last cycle after the still-picture timing becomes equal to zero, and the length of a portion of the movie file of this cycle before the still-picture timing becomes shorter than the above-indicated time $a_n$.

Figure 11:
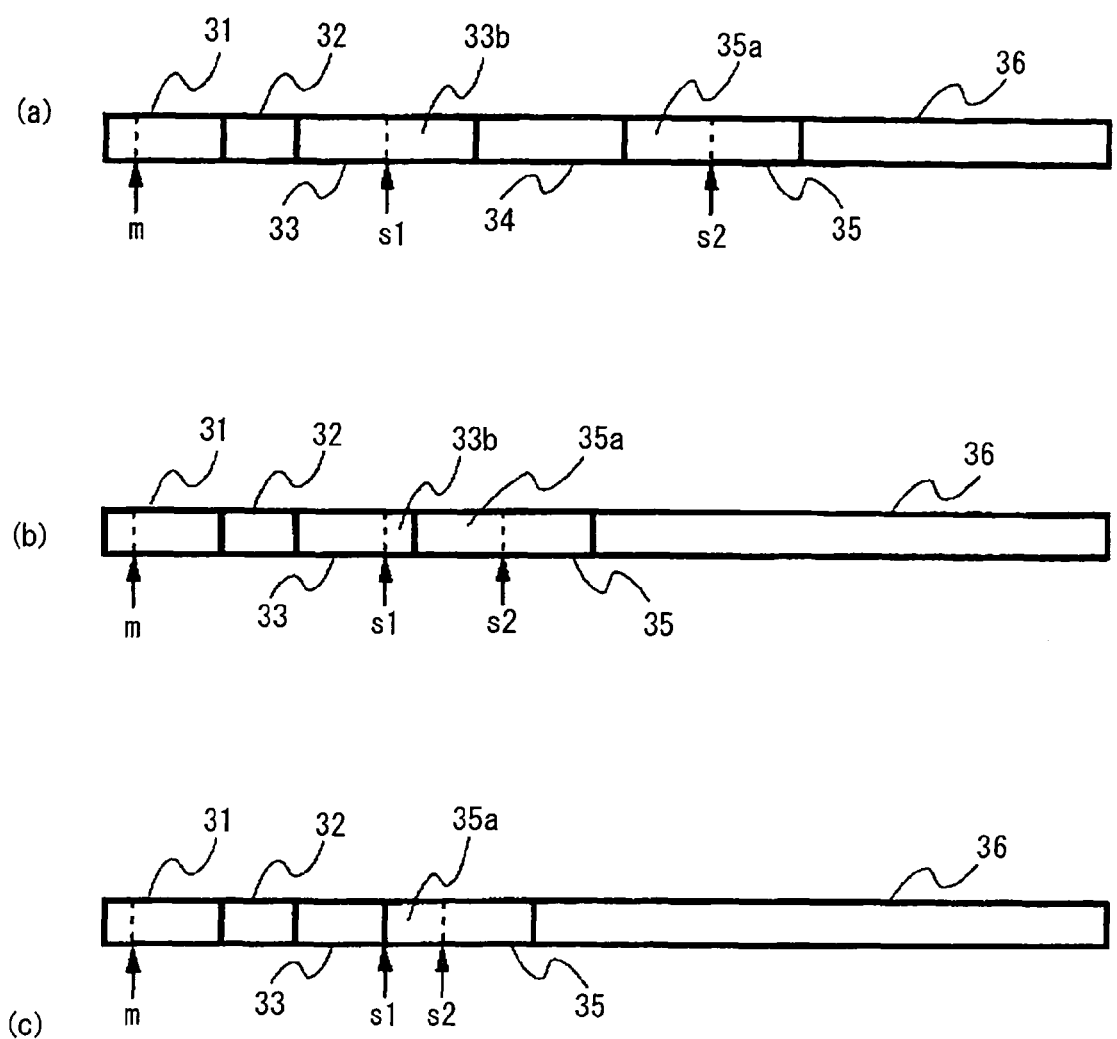
FIG. 11 shows timing charts useful for explaining the functions provided in the flow of FIG. 9.

FIG. 11 shows timing charts useful for explaining the functions performed in the flow of FIG. 9 as described above, and the timing charts are plotted with the time axis along which time proceeds from left to right as viewed in FIG. 11. Each of the bands shown in (a), (b) and (c) of FIG. 11 represents a movie captured by operating the movie taking operation unit 9 at the time of arrow "m", and thick lines indicate partitions that define independent movie files. Broken lines shown in FIG. 11 indicate points in time at which the movie taking operation unit 9 is operated or still-picture timing signals are received.

The above-described functions will be specifically described with reference to FIG. 11(a). A picture-taking operation timing signal indicative of the time of operation of the movie taking operation unit 9 is added at time m to a movie file 31. The movie file 31, which is to be handled in a manner similar to short movie recording, is delimited at a point reached upon a lapse of a given time from time m, and is regarded as a single movie file. In FIG. 11, while a movie file 32 subsequent to the movie file 31 is created, no still-picture timing signal is added to the movie file 32, and therefore, the movie file 32 is created as a movie file of a different type from the movie file 31. Subsequently, a still-picture timing signal is received at time s1, and a movie file 33 to which the still-picture timing signal is added is created. A portion 33b of the movie file 33 ranges from the still-picture timing s1 to a point in time at which a given period of time b elapses from the timing s1. No still-picture timing signal is added to a movie file 34 following the movie file 33. Then, a movie file 35 is created based on a still-picture timing signal generated at time s2, such that the still-picture timing signal is added to the movie file 35. While a movie file 36 is created after the completion of creation of the movie file 35, no still-picture timing signal is added to the movie file 36. In the "highlight movie reproduction mode", the movie file 31 to which the picture-taking operation timing signal of the movie taking operation unit 9 is added and the moving files 33, 35 to which the still-picture timing signals are added, and the like, are extracted and connected together for reproduction. On the other hand, the movie files 32, 34, 36 to which no still-picture timing signals are added, and the like, are excluded from objects to be reproduced in the "highlight movie reproduction mode".

FIG. 11(*a*) as described above corresponds to the case where the control proceeds from step S61 to step S63 via step S62, and proceeds from step S65 directly to step S67 in the flow of FIG. 9.

Next, FIG. 11(*b*) corresponds to the case where, with regard to the movie file 35, the still-picture timing signal s2 of this cycle is generated within a predetermined time ($b_{n-1}+a_n$) from generation of the still-picture timing signal s1 of the last cycle, whereby the control proceeds from step S61 to step S68 in the flow of FIG. 9. FIG. 11(*b*) also corresponds to the case where the still-picture timing signal s2 of this cycle is generated after a lapse of a given period of time $a_n$ or longer from generation of the still-picture timing signal s1 of the last cycle, whereby the control proceeds from step S69 to step S62. Referring to FIG. 11(*b*), while the movie file 35 of this cycle starts in the middle of the movie file 33 of the last cycle such that the time periods of these files 33, 35 overlap each other, creation of the movie file 33 of the last cycle is forced to be finished or aborted with a higher priority given to the movie file 35 of this cycle. As a result, the time period of the portion 33*b* of the movie file 33 which starts from the still-picture timing s1 is shortened. This function corresponds to step S68 of FIG. 9.

Next, FIG. 11(*c*) shows the case where still-picture timing signals are generated at further closer points in time, which corresponds to the case where the control proceeds from step S61 to step S68, and then proceeds from step S69 to step S70 in the flow of FIG. 9. Namely, FIG. 11(*c*) illustrates a situation where the original time period of the movie file 35 of this cycle encroaches upon a region prior to the still-picture timing of the last cycle. In the flow of FIG. 9, this situation corresponds to the case where an affirmative decision (YES) is obtained in step S69. If a higher priority is given to the movie file of this cycle even in this case, the movie file based on the still-picture timing signal of the last cycle would be lost or eliminated. Thus, in step S70, the movie file of this cycle is created so as to start from the time of generation of the still-picture timing signal of the last cycle. As a result, the movie file 33 in FIG. 11(*c*) is created with its terminal end coinciding with the still-picture timing s1, and a portion 35*a* of the movie file 35 prior to the still-picture timing s2 becomes shorter than the original time period of this portion 35*a*.

Figure 12:
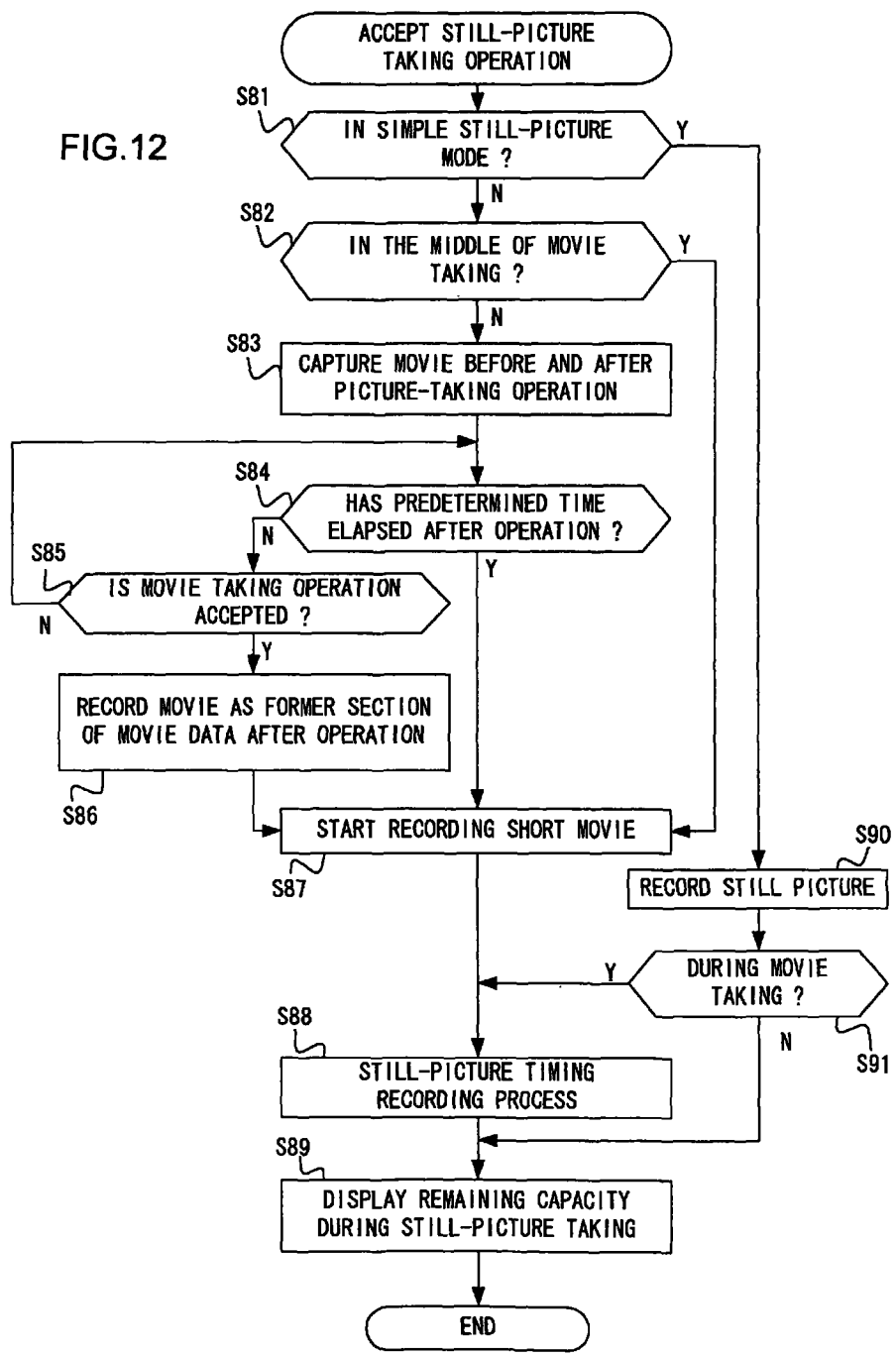
FIG. 12 shows the flow of still-picture taking which starts when a still-picture taking operation unit is operated while its operation is allowed to be accepted in step S8 of FIG. 4.

FIG. 12 shows the flow of still-picture taking that starts when the still-picture taking operation unit 12 is operated while its operation is allowed to be accepted in step S8 of FIG. 4. Once a still-picture taking operation is accepted, the flow of FIG. 12 starts, and step S81 checks whether the operating mode of the camera is the "simple still-picture taking mode". If the camera is in an operating mode other than the "simple still-picture taking mode", it is determined in step S82 whether a movie is being taken, namely, the camera is in the middle of video recording. If a movie is not being taken in step S82, it is determined that the camera is in the "short-movie taking mode", and the control proceeds to step S83.

In step S83, movie data spanning a given period of time set with reference to the time of operation of the still-picture taking operation unit 12 is captured or read from the buffer unit 7, and the control proceeds to step S84. In step S84, it is determined whether a predetermined time corresponding to the time set in step S32 of FIG. 6 has elapsed after the still-picture taking operation unit 12 was operated. If the predetermined time has not elapsed, the control proceeds to step S85 to check whether the movie taking operation unit 9 is operated. If no operation is detected, the control returns to step S84. Then, this loop is repeated until the predetermined time elapses.

If it is determined in step S85 that the movie taking operation unit 9 is operated before a lapse of the predetermined time, the control proceeds to step S86 to record the movie data captured in step S83 in the recording unit 11 as the former section of movie data, so that the movie data is seamlessly joined or connected to movie data acquired in response to the operation of the movie taking operation unit 9. Then, step S87 is executed to start recording of a short movie. If, on the other hand, the predetermined time has elapsed in step S84 without any operation of the movie taking operation unit 9, the control proceeds to step S87.

In step S87, recording of a short movie is started based on movie data captured in step S83, and the control proceeds to step S88. Step S88 corresponds to the still-picture timing recording process shown in FIG. 9 for recording still-picture timing signals during movie taking. After a short movie file is created in this manner, the control proceeds to step S89 to display the remaining capacity during still-picture taking, and the flow of still-picture taking ends.

If, on the other hand, it is determined in step S81 that the camera is in the "simple still-picture taking mode", the control proceeds to step S90 to create a still image file through still-image compression. Then, it is determined in step S91 whether a movie is being taken, namely, the camera is in the middle of video recording. If a movie is being taken, a still-picture timing signal based on the operation of the still-picture taking operation unit 12 is recorded into the movie file, in addition to compression and recording of the still image, and the control proceeds to step S88. If, on the other hand, it is determined in step S91 that a movie is not being taken, namely, the camera is not in the middle of video recording, the control directly proceeds to step S89 to display the remaining capacity during still-picture taking, and the flow of still-picture taking ends.

Figure 13:
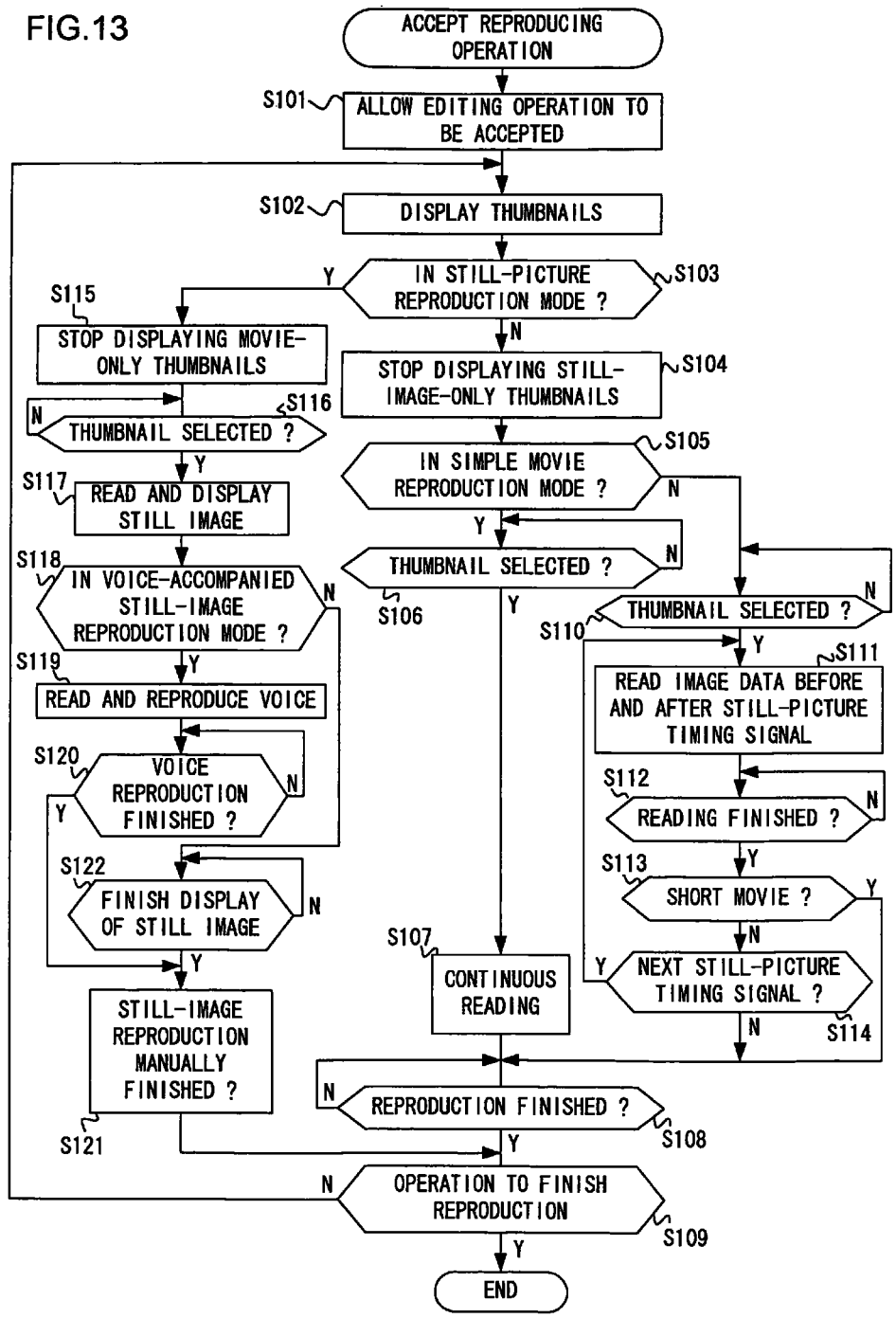
FIG. 13 shows the flow of reproduction which starts when a reproducing operation unit is operated while its operation is allowed to be accepted in step S14 of FIG. 4.

FIG. 13 shows the reproduction flow that starts when the reproducing operation unit 14 is operated while its operation is allowed to be accepted in step S14 of FIG. 4. Once a reproducing operation is accepted, the flow of FIG. 13 starts, and the controller 1 is allowed to accept an editing operation in step S101. Then, an operation to display thumbnails is performed in step S102. In step S102, with regard to movie files in which still-picture timing signals are recorded, images captured at the time of generation of the still-picture timing signals are displayed as still-image thumbnails. Also, if a movie is taken in the "movie/manual still-picture taking mode" or "movie/automatic still-picture taking mode", and a plurality of movie files are created between the start of movie taking and the end thereof, thumbnails of these movie files can be mixed and displayed. Suppose a movie A and a movie B are taken over mutually different time periods, and movie files a1, a2, a3, a4 in which still-picture timing signals are recorded are generated as a result of taking of the movie A, while movie files b1, b2, b3 in which still-picture timing signals are recorded are generated as a result of taking of the movie B. In this case, thumbnails of the movie files a1, a2, a3, a4, b1, b2, b3 may be mixed together, irrespective of the origins from which the movies are generated, and a list of these thumbnails may be displayed. Also, particular movie files may be extracted or selected from these movie files under a certain search condition or conditions, and only the thumbnails of the movie files that match the search condition(s) may be displayed.

After the thumbnails are displayed through the thumbnail display operation of step S102, it is determined in step S103 whether the camera is in the still-image reproduction mode. If it is not in the still-image reproduction mode, the camera is in the movie reproduction mode; therefore, the control proceeds to step S104 to stop displaying thumbnails (still-image-only thumbnails) of data obtained through still-image compression, out of the thumbnails displayed on the image display unit 6. This is because the thumbnails of data obtained through sill-image compression corresponds to the still-image information only, and, even if these thumbnails are selected, corresponding image data cannot be reproduced while the camera is in the movie reproduction mode.

After display of the still-image-only thumbnails is stopped, the control proceeds to step S105 to check whether the camera is in the "simple movie reproduction mode". If it is determined that the camera is in the "simple movie reproduction mode", the controller 1 waits for an operation to select a thumbnail, and proceeds to step S107 if such an operation is detected, so as to continuously retrieve or read movie data beginning from the selected thumbnail, up to its terminal end, and start reproducing the retrieved movie data. Where the movie data to be reproduced consists of a plurality of independent movie files created in the "movie/manual still-picture taking mode" or the "movie/automatic still-picture taking mode", these independent movie files are successively reproduced in the order in which these files were created, as a seamless or continuous sequence of a movie.

In step S108, the controller 1 waits for the completion of reproduction of the movie. If the reproduction is completed, the control proceeds to step S109 to check whether the reproducing operation unit 14 is operated to finish reproduction. If the operation to finish reproduction is detected in step S109, the reproduction processing ends. If not, the control returns to step S102.

If it is determined in step S105 that the camera is in a mode other than the "simple movie reproduction mode", the control proceeds to step S110 to wait for an operation to select a thumbnail. If the operation is detected, the control proceeds to step S107 to perform an operation to read a movie file corresponding to the selected thumbnail. When the camera is not in the "simple movie reproduction mode", it is set to either the "short-movie reproduction mode" or the "highlight movie reproduction mode". Thus, in step S111, a movie file in which movie data spanning a given period of time set with reference to a picture-taking operation timing signal or a still-picture timing signal is recorded is read out.

In step S111, the controller 1 waits for completion of reading of the movie file. Upon completion of the reading operation, it is determined in step S112 whether the camera is in the "short-movie reproduction mode". If a negative decision (NO) is obtained, it is determined that the camera is in the "highlight movie reproduction mode", and the control proceeds to step S113. In step S113, it is checked whether there is any movie file including a timing signal subsequent to that of the read movie file, in a sequence of movie for which the start of movie taking and the end thereof are designated by operating the movie taking operation unit 9. If the movie file including the next timing signal is present, the control returns to step S111, and repeats the loop of step S111 through step S114 until the last movie file including a still-picture timing signal in the sequence of a movie is read. In this manner, all of the movie files in which still-picture timing signals are recorded, which are present in the sequence of movie, are extracted. If it is found in step S114 that there is no more movie file in which a still-picture timing signal is recorded, an operation to connect the extracted movie files to each other and reproduce the movie is started, and the control proceeds to step S108.

If it is determined in step S113 that the camera is in the "short-movie reproduction mode", an operation to reproduce the movie file corresponding to the selected thumbnail is started after completion of the reading of the movie file, and the control proceeds to step S108.

If step S103 determines that the camera is set in the still-image reproduction mode, the control proceeds to step S115 to stop display of thumbnails (movie-only thumbnails) of movie files in which no picture-taking operation timing signal nor still-picture timing signal is recorded, out of the thumbnails displayed on the image display unit 6. In step S115, the thumbnails of the movie files in which the picture-taking operation timing signals or still-picture timing signals are recorded are regarded as objects to be displayed, because still images can be displayed based on not only image data obtained through still-image compression, but also the movie files in which the picture-taking operation timing signals or still-picture timing signals are recorded.

After display of the movie-only thumbnails is stopped, the control proceeds to step S116 to wait for an operation to select a thumbnail, and proceeds to step S117 if such an operation is detected, to read and display a still image corresponding to the selected thumbnail. In step S117, the selected thumbnail is not limited to that of a still image obtained through still-image compression, but a still image corresponding to the selected thumbnail may be cut out from a movie file, to be subjected to still-image processing, and then displayed.

After the processing for still-image display is completed, the control proceeds to step S118 to check whether the camera is in the "voice-accompanied still-image reproduction mode". If the camera is in the "voice-accompanied still-image reproduction mode", the control proceeds to step S119 to read voice data and reproduce the voice data along with the still image. Step S120 checks whether voice reproduction has been completed in the reproduction of the voice-accompanied still image, and, if the voice reproduction is completed, the control proceeds to step S121 to finish reproduction and display of the still image at the same time. Thus, in the voice-accompanied still-image reproduction mode, display of the still image is automatically finished at the same time that the voice reproduction is completed.

If, on the other hand, it is determined in step S118 that the camera is not in the "voice-accompanied still-image reproduction mode", but in the "still-image reproduction mode" without voice, the control proceeds to step S122. In step S122, the controller 1 checks whether the reproduction of the still image has been manually terminated by the reproduction operating unit 14. If the terminating operation is detected, the control proceeds to step S121 to finish reproduction and display of the still image.

Figure 14:
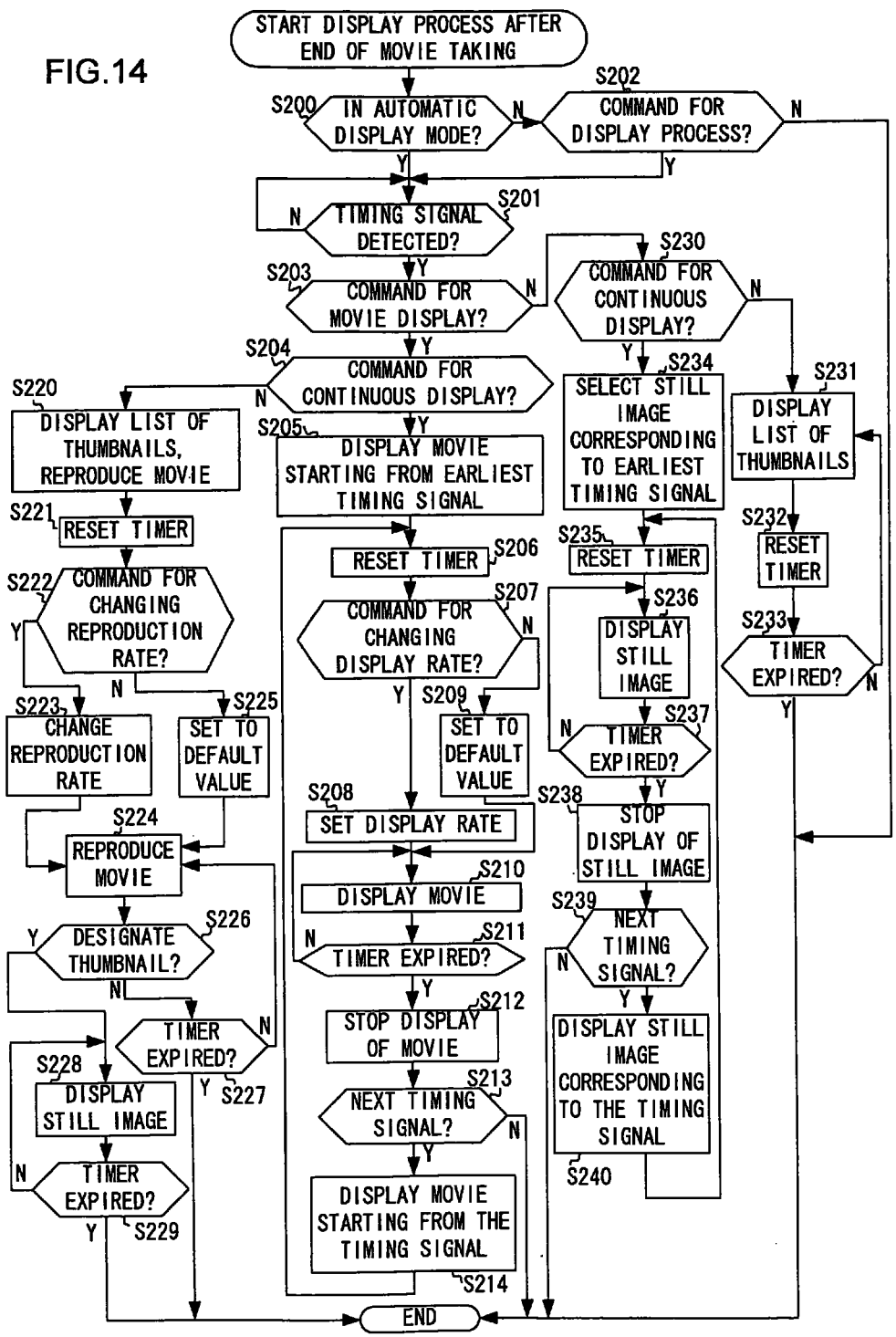
FIG. 14 is a flowchart showing details of a display process after the end of movie taking in step S43 of FIG. 6.

FIG. 14 is a flowchart showing details of a display process after the end of movie taking in step S43 of FIG. 6.

As shown in FIG. 14, once the display process after the end of movie taking starts, it is initially determined in step S200 whether the camera is set in an automatic display mode by means of the manual operation unit 3.

If it is determined that the camera is in the automatic display mode, it is determined in step S201 whether a still-picture timing signal is detected.

If, on the other hand, it is determined that the camera is not in the automatic display mode, it is determined in step S202 whether the manual operation unit 3 has been operated to generate a command for the display process after the end of movie taking.

If it is determined that no command for the display process after the end of movie taking is generated, the display process after the end of movie taking ends.

If, on the other hand, it is determined in step S202 that a command for the display process after the end of movie taking has been generated, the control proceeds to step S201.

If it is determined in step S201 that a still-picture timing signal is detected, it is determined in step S203 whether the manual operation unit 3 has been operated to generate a command for display of a movie.

If it is determined that a command for display of a movie has been generated, it is determined in step S204 whether the manual operation unit 3 has been operated to generate a command for continuous display of a movie.

If it is determined that a command for continuous display of a movie has been generated, a movie beginning with a still image corresponding to a still-picture timing signal that was generated at the earliest time are displayed on the image display unit 6 in step S205, and a display timer (not shown) is reset in step S206.

Then, it is determined in step S207 whether the manual operation unit 3 has been operated to generate a command for a change of the rate or speed at which the movie is displayed.

If a command for a change of the display rate of movie has been generated, the display rate of movie is changed in step S208, and the control proceeds to step S210. If, on the other hand, no command for a change of the display rate of movie is generated, the display rate of movie is set to a default value in step S209, and the control proceeds to step S210.

In step S210, the movie is displayed at the set display rate on the image display unit 6, and display of the movie beginning with the still image corresponding to the earliest still-picture timing signal is continued until the display timer (not shown) expires.

When the display timer expires in step S211, display of the movie beginning with the still image corresponding to the earliest still-picture timing signal is stopped in step S212, and the control proceeds to step S213.

In step S213, it is determined whether there is another still-picture timing signal generated later than the earliest still-picture timing signal.

If it is determined that there is a still-picture timing signal generated at the later point in time, a movie beginning with a still image corresponding to the still-picture timing signal are displayed on the image display unit 6 in step S214, and the control returns to step S206.

If, on the other hand, it is determined in step S213 that there is no still-picture timing signal generated at the later point in time, the display process after the end of movie taking ends.

If it is determined in step S204 that the manual operation unit 3 has been operated to generate a command for continuous display of movie, on the other hand, a list of thumbnails is displayed on the image display unit 6, and each thumbnail is reproduced in the form of movie.

Subsequently, a display timer (not shown) is reset in step S221, and the control proceeds to step S222.

In step S222, it is determined whether the manual operation unit 3 has been operated to generate a command for a change of the rate or speed at which the movie is reproduced.

If it is determined that a command for a change of the reproduction rate of movie has been generated, the movie reproduction rate is changed in step S223, and the control proceeds to step S224. If, on the other hand, no command for a change of the movie reproduction rate is generated, the movie reproduction rate is set to a default value in step S225, and the control proceeds to step S224.

In step S224, the movie is reproduced on the image reproduction unit 6 at the set reproduction rate.

Subsequently, the control proceeds to step S226 to determine whether the manual operation unit 3 has been operated to designate a thumbnail.

If it is determined that no thumbnail is designated, display of movie of each thumbnail is continued until the display timer (not shown) expires. If the display timer expires in step S227, the display process after the end of movie taking ends.

If, on the other hand, it is determined that a thumbnail has been designated, corresponding image data is read from the recording unit 11 and is decompressed at the decompression unit 14, so that a still image is displayed on the image display unit 6 in step S228. The still image displayed at this time may be of a higher resolution than the movie that have been displayed. The still image may also be displayed using still image data having a lower compression ratio than image data of the movie that are being displayed.

In either case, the still image thus displayed has a larger amount of information than a corresponding one of the moving images (movie).

The still image thus displayed is kept being displayed on the image display unit 6 until a display timer (not shown) expires, and the display process after the end of movie taking ends when the display timer expires in step S229.

If it is determined in step S203 that no command for display of movie is generated by the manual operation unit 3, it is determined in step S230 whether the manual operation unit 3 has been operated to generate a command for continuous display of still images.

If it is determined that no command for continuous display of still images is generated, thumbnails are displayed on the image display unit 6 in step S231, and a display timer (not shown) is reset in step S232.

The thumbnails thus displayed are kept being displayed on the image display unit 6 until the display timer expires, and the display process after the end of movie taking ends when the display timer expires.

If, on the other hand, it is determined in step S230 that a command for continuous display of still images has been generated, still image data corresponding to a still-picture timing signal generated at the earliest time is selected in step S234.

Next, a display timer (not shown) is reset in step S235, and the still image is displayed on the image display unit 6 in step S236.

When the display timer expires in step S237, the display of the still image corresponding to the earliest still-picture timing signal is stopped in step S238, and the control proceeds to step S239.

In step S239, it is determined whether there is any still-picture timing signal that was generated at the later point in time.

If it is determined that there is no still-picture timing signal generated at the later point in time, the display process after the end of movie taking ends.

If, on the other hand, it is determined that there is a still-picture timing signal generated at the later point in time, a still image corresponding to the still-picture timing signal is displayed on the image display unit 6, and the control returns to step S235.

It is to be understood that the present invention is not limited to the above-described embodiment, but may be embodied with various changes or modifications within the scope of the invention as defined in the claims, and that the modified embodiments are also included in the scope of the invention.

In the above-described embodiment, when the operating mode of the camera is set to the "movie/manual still-picture taking mode" or the "movie/automatic still-picture taking mode", the camera is arranged to record only the still-picture timing signal(s), and reproduce a still image acquired at each still-picture timing signal, based on compressed movie data. However, the camera may be arranged to record compressed still image data along with the still-picture timing signal(s).

In the above-described embodiment, movie files in which still-picture timing signals are recorded are created while being discriminated from movie files in which no timing signals are recorded, as shown in FIG. 10 and FIG. 11, and a plurality of movie files in which timing signals are recorded are extracted and connected together for reproduction in the highlight movie reproduction mode. However, even if a still-picture timing signal is generated during taking of a sequence of movie, a movie file is not separately created, but only the still-picture timing signal may be recorded. To perform highlight movie reproduction based on the movie thus recorded, a pair of time stamps that define given periods of time before and after the still-picture timing signal are detected at the time of reproduction, and movie data between the time stamps is extracted. Then, similar movie data corresponding to a plurality of pairs of time stamps are extracted, and connected together to be reproduced.

In the illustrated embodiment, when movie data is created by connecting a short movie with movie data, as shown in FIG. 8, movie data of the short movie is created as an independent movie file. However, movie data of a short movie is not necessarily created as an independent movie file. In this case, for reproduction of the short movie, movie data spanning a given period of time is extracted from movie data obtained by connecting the short movie with the movie data, based on a still-picture timing signal added to the movie data, and may be reproduced as movie data for the short movie.

Also, movie data is not necessarily created by connecting a short movie with movie data, but may be created while discriminating a short movie and movie data from each other, as in the case shown in FIG. 10 and FIG. 11. In this arrangement, when movie taking is started within the latter-half time of a short movie, recording of the short movie may be aborted or stopped at the time of start of movie taking, and movie data may be created from the time of start of movie taking.

In the display process after the end of movie taking according to the embodiment as shown in FIG. 14, still images captured when still-picture timing signals are generated or a movie starting from each of the still images are displayed on the image display unit 6. However, in addition to or in place of display of the still images captured when the still-picture timing signals are generated or the movie starting from each of the still images on the image display unit 6, still images captured at the time of generation of picture-taking operation timing signals indicative of points in time at which the moving-picture taking operation unit 9 was operated, or a movie starting from each of the still images may be displayed on the image display unit 6. Furthermore, where timing signals for chapters are generated during taking of a movie, still images captured at the time of generation of the timing signals for chapters, or a movie starting from each of the still images, may be displayed on the image display unit 6.

The disclosure of the following application based on which the right of priority is claimed is incorporated herein by reference.

Japanese Patent Application No. 2006-181529 (filed on Jun. 30, 2006)

The invention claimed is:

1. An imaging apparatus, comprising:
an imaging unit configured to repeatedly capture images of a subject;
a movie taking directing unit configured to direct starting and finishing of picture-taking for a movie in a movie mode based on the captured images, wherein the movie mode includes any one or more of a short movie mode, a simple movie mode, a movie mode with manual still-picture, and a movie mode with automatic still-picture;
a timing information generating unit configured to generate timing information that indicates a specific time point within an imaging period of the movie in response to one of a manual operation by a user and a change in a picture-taking condition when the imaging unit is repeatedly capturing the images for the movie, the timing information being additional information to movie data of the movie to be used to display an image corresponding to the timing information;
a recording unit configured to record the movie in response to the movie taking directing unit and to record the timing information in response to the timing information generating unit when the imaging unit is repeatedly capturing the images for the movie;
a display unit; and
a display control unit configured to cause the display unit to automatically display an image corresponding to the timing information, which is extracted partially from the movie recorded by the recording unit, just when picture-taking for the movie directed by the movie taking directing unit is finished.

2. The imaging apparatus according to claim 1, further comprising:
an information generating operation unit configured to be manually operated by the user to cause the timing information generating unit to generate the timing information when the imaging unit is repeatedly capturing the images for the movie.

3. The imaging apparatus according to claim 2, wherein a still-picture taking operation unit configured to designate a recording time of a still image based on the captured images is provided as the timing information generating unit.

4. The imaging apparatus according to claim 3, wherein the recording unit records still image, in response to an operation of the still-picture taking operation unit.

5. The imaging apparatus according to claim 4, wherein the recording unit records the still image independently of the movie, based on the operation of the still-picture taking operation unit.

6. The imaging apparatus according to claim 4, further comprising:
a detecting unit configured to detect the change in the picture-taking condition when the imaging unit is repeatedly capturing the images for the movie, wherein the timing information is generated based on a result of detection of the detecting unit.

7. The imaging apparatus according to claim 1, wherein the display control unit causes the display unit to display the movie spanning a given period of time including a time corresponding to the timing information.

8. The imaging apparatus according to claim 7, wherein
the display control unit changes a reproduction speed of the movie spanning the given period of time to cause the display unit to display the movie at the changed reproduction speed.

9. The imaging apparatus according to claim 7, wherein
the display control unit extracts a plurality of pieces of the movie each spanning the given period of time including a time corresponding to each of a plurality of pieces of the timing information, based on the timing information recorded, and connects the extracted pieces of the movie together for display on the display unit.

10. The imaging apparatus according to claim 7, wherein
the display control units extracts a plurality of pieces of the movie each spanning the given period of time including a time corresponding to each of a plurality of pieces of the timing information, based on the timing information recorded, and causes the display unit to display sets of images provided by the extracted pieces of the movie at the same time.

11. The imaging apparatus according to claim 1, wherein
the display control unit causes the display unit to display a still image over a given period of time, based on the movie captured at a time corresponding to the timing information.

12. The imaging apparatus according to claim 11, wherein
the display control unit causes the display unit to successively display still images captured at times corresponding to a plurality of pieces of the timing information, at predetermined time intervals, based on the plurality of pieces of the timing information recorded.

13. The imaging apparatus according to claim 11, wherein
the display control unit causes the display unit to display still images captured at times corresponding to a plurality of pieces of the timing information, at the same time, based on the plurality of pieces of the timing information recorded.

14. The imaging apparatus according to claim 1, further comprising:
a manual operation unit configured to be operated by the user during display of the image by the display control unit, wherein
the display control unit causes the display unit to display the movie spanning a given period of time including a time corresponding to the timing information, and causes the display unit to display a still image having a larger amount of information than a corresponding image of the movie, in place of the movie that are being displayed on the display unit, when the manual operation unit is operated.

15. The imaging apparatus according to claim 1, further comprising:
an operation switching unit configured to cause the display control unit to operate in a selected one of a plurality of modes.

16. An image displaying method, comprising:
repeatedly capturing images of a subject and recording the images;
directing starting and finishing of picture-taking for a movie in a movie mode based on the captured images, wherein the movie mode includes any one or more of a short movie mode, a simple movie mode, a movie mode with manual still-picture, and a movie mode with automatic still-picture;
generating timing information that indicates a specific time point within an imaging period of the movie in response to one of a manual operation by a user and a change in a picture-taking condition when repeatedly capturing the images for the movie, the timing information being additional information to movie data of the movie to be used to display an image corresponding to the timing information;
recording the movie in response to directing starting and finishing of picture-taking for the movie;
recording the timing information in response to generating of the timing information when repeatedly capturing the images; and
displaying, automatically, an image corresponding to the timing information, which is extracted partially from the recorded movie, just when picture-taking for the movie is finished.

17. The image displaying method according to claim 16, wherein
the timing information is generated in response to the change in the picture-taking condition when the images for the movie are being repeatedly captured.

18. The image displaying method according to claim 16, wherein
the movie spanning a given period of time including a time corresponding to the timing information is displayed, as the image corresponding to the timing information.

19. The image displaying method according to claim 18, wherein
the movie spanning the given period of time is displayed, as the image corresponding to the timing information, at a reproduction speed that is changed.

20. The image displaying method according to claim 18, wherein
a plurality of pieces of the movie each spanning the given period of time including a time corresponding each of a plurality of pieces of the timing information are connected together, and are displayed as the image corresponding to the timing information.

21. The image displaying method according to claim 16, wherein
a still image is displayed as the image corresponding to the timing information.

* * * * *